(12) United States Patent
Kajihara et al.

(10) Patent No.: US 12,077,036 B2
(45) Date of Patent: Sep. 3, 2024

(54) LAMINATED GLASS FOR VEHICLE

(71) Applicant: AGC Inc., Tokyo (JP)

(72) Inventors: Takato Kajihara, Tokyo (JP); Shigeki Sawamura, Tokyo (JP); Shusaku Akiba, Tokyo (JP); Yutaka Kuroiwa, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/050,669

(22) Filed: Oct. 28, 2022

(65) Prior Publication Data

US 2023/0120488 A1 Apr. 20, 2023

Related U.S. Application Data

(63) Continuation of application No. PCT/JP2021/016561, filed on Apr. 26, 2021.

(30) Foreign Application Priority Data

May 1, 2020 (JP) .................................. 2020-081159

(51) Int. Cl.
*B60J 1/02* (2006.01)
*B32B 7/02* (2019.01)
*B32B 17/10* (2006.01)
(Continued)

(52) U.S. Cl.
CPC ..................................... *B60J 1/02* (2013.01);
*B32B 7/02* (2013.01); *B32B 17/10036* (2013.01);
(Continued)

(58) Field of Classification Search
CPC ......... B32B 7/00–7/14; B32B 17/00–17/1099;
C03C 3/076–3/118
See application file for complete search history.

(56) References Cited

U.S. PATENT DOCUMENTS

| 10,343,378 B2 | 7/2019 | Lestringant et al. |
| 2005/0202951 A1* | 9/2005 | Hulme .................... C03C 3/087 |
| | | 65/99.2 |

(Continued)

FOREIGN PATENT DOCUMENTS

| JP | 2017-181480 A | 10/2017 |
| JP | 2020-40869 A | 3/2020 |
| WO | WO 2018-123777 A1 | 7/2018 |
| WO | WO 2018-199299 A1 | 11/2018 |

OTHER PUBLICATIONS

International Search Report issued Jul. 6, 2021 in PCT/JP2021/016561 filed Apr. 26, 2021, 5 pages (with English Translation).

*Primary Examiner* — Prashant J Khatri
(74) *Attorney, Agent, or Firm* — Oblon, McClelland, Maier & Neustadt, L.L.P.

(57) ABSTRACT

The present invention pertains to a laminated glass for a vehicle, the laminated glass including a first glass sheet, a second glass sheet and an intermediate film sandwiched between the first glass sheet and the second glass sheet, in which: the total thickness of the first glass sheet, the second glass sheet and the intermediate film is 4.0 mm or more; the first glass sheet is formed of a borosilicate glass containing, in terms of oxide by molar percentage, 1.0% or more of $B_2O_3$; and when a radio wave (TM wave) with a frequency of 79[GHz] is made incident at an incident angle of 60° to the first glass sheet, the transmission property S21 is −4.0 [dB] or more.

32 Claims, 9 Drawing Sheets

(51) Int. Cl.
  *B32B 27/30* (2006.01)
  *B60J 1/00* (2006.01)
  *C03C 3/087* (2006.01)
  *C03C 3/091* (2006.01)
  *C03C 3/095* (2006.01)
  *C03C 4/00* (2006.01)

(52) U.S. Cl.
  CPC ........ *B32B 17/10761* (2013.01); *B32B 27/30* (2013.01); *B60J 1/001* (2013.01); *C03C 3/087* (2013.01); *C03C 3/091* (2013.01); *C03C 3/095* (2013.01); *C03C 4/00* (2013.01); *B32B 2250/40* (2013.01); *B32B 2307/54* (2013.01); *B32B 2307/558* (2013.01); *B32B 2307/732* (2013.01); *B32B 2605/006* (2013.01); *C03C 2205/00* (2013.01)

(56) References Cited

U.S. PATENT DOCUMENTS

| | | | |
|---|---|---|---|
| 2012/0328843 A1* | 12/2012 | Cleary | C03C 3/095 428/213 |
| 2015/0314571 A1* | 11/2015 | Cites | C03C 3/097 501/63 |
| 2016/0263969 A1* | 9/2016 | Lestringant | B32B 17/101 |
| 2017/0274832 A1 | 9/2017 | Abe | |
| 2018/0194114 A1 | 7/2018 | Mannheim Astete et al. | |
| 2019/0061641 A1 | 2/2019 | Kikuchi et al. | |
| 2019/0299765 A1 | 10/2019 | Yajima et al. | |
| 2020/0023617 A1 | 1/2020 | Hosoda et al. | |
| 2020/0031708 A1 | 1/2020 | Maeda et al. | |
| 2020/0122433 A1 | 4/2020 | Hosoda et al. | |

* cited by examiner

LAMINATED GLASS FOR VEHICLE

CROSS-REFERENCE TO RELATED APPLICATIONS

This is a bypass continuation of International Patent Application No. PCT/JP2021/016561, filed on Apr. 26, 2021, which claims priority to Japanese Patent Application No. 2020-081159, filed on May 1, 2020. The contents of these applications are hereby incorporated by reference in their entireties.

TECHNICAL FIELD

The present invention relates to a vehicular laminated glass.

BACKGROUND ART

High-speed, large-capacity communication infrastructures such as those of 4GLTE to 5G in addition to communications in wavelength bands of microwaves and millimeter waves have expanded in recent years, and there is a tendency that their use bands increase so as to cover a 3 GHz band to a 5 to 80 GHz band. And antennas that are high in directivity and reception sensitivity in frequency bands including those bands are desired. V2X (Vehicle to Everything) which is expected to serve for vehicle-to-vehicle communication and road-to-vehicle communication is being applied to many uses; for example, it is being used for ETCs in Europe in a 5.9 GHz band.

To perform such a communication in a high-frequency band, a vehicular radar (millimeter-wave radar) installed in a vehicle, for example, transmits radio waves at a frequency 76.5 GHz. Such radio waves in a millimeter band are conspicuous in reflection by an ordinary vehicular glass, particularly a windshield. As a countermeasure, a radar window is provided in which a resin that is lower than glass in relative permittivity is disposed in a part of a windshield, whereby the transparency for transmission and reception waves is increased by decreasing a reflection loss that occurs when radar waves pass through the radar window (refer to Patent document 1, for example).

CITATION LIST

Patent Literature

Patent document 1: JP-A-2017-181480

SUMMARY OF INVENTION

Technical Problems

However, the configuration of Patent document 1 has a problem that windshield processing is complex though the transparency for millimeter-wave radar waves is increased. Furthermore, another problem exists that the quality of a windshield is lowered; for example, the strength against external impact caused by flying stones or the like received during running (hereinafter referred to as "chipping resistance" or "strength against flying stones") is lowered.

An object of the present invention is to provide a vehicular laminated glass that satisfies strength-related quality that is required for conventional windshields and is superior in the radio wave transparency in a high-frequency band of a millimeter-wave radar waves or the like though the vehicular laminated glass is not complex in structure.

Solution to Problem

A vehicular laminated glass according to an embodiment of the invention includes a first glass plate, a second glass plate, and an intermediate film sandwiched between the first glass plate and the second glass plate, in which the total thickness of the first glass plate, the second glass plate, and the intermediate film is 4.0 mm or larger; the first glass plate is a borosilicate glass containing $B_2O_3$ at 1.0% or more in mole percentage in terms of oxides; and a transmission characteristic S21 that is obtained when TM radio waves having a frequency of 79 GHz enter the first glass plate of the vehicular laminated glass at an incident angle of 60° is −4.0 dB or larger.

In a vehicular laminated glass according to one mode of implementation of the invention, a transmission characteristic S21 that is obtained when TM radio waves having a frequency of 79 GHz enter the first glass plate at an incident angle of 67.5° may be −3.1 dB or larger.

In a vehicular laminated glass according to one mode of implementation of the invention, a transmission characteristic S21 that is obtained when TM radio waves having a frequency 28 GHz enter the first glass plate at an incident angle in a range of 0° to 700 may be −2.0 dB or larger.

In a vehicular laminated glass according to one mode of implementation of the invention, a transmission characteristic S21 that is obtained when TM radio waves having a frequency 28 GHz enter the first glass plate at an incident angle of 67.5° may be −0.28 dB or larger.

In a vehicular laminated glass according to one mode of implementation of the invention, a transmission characteristic S21 that is obtained when TM radio waves having a frequency of 79 GHz enter the first glass plate at an incident angle of 45° may be −4.0 dB or larger.

In a vehicular laminated glass according to one mode of implementation of the invention, a transmission characteristic S21 that is obtained when TM radio waves having a frequency of 79 GHz enter the first glass plate at an incident angle of 20° may be −4.0 dB or larger.

In a vehicular laminated glass according to one mode of implementation of the invention, the first glass plate may be thicker than the second glass plate.

In a vehicular laminated glass according to one mode of implementation of the invention, the thickness of the first glass plate may be 2.50 mm or larger.

In a vehicular laminated glass according to one mode of implementation of the invention, the thickness of the second glass plate may be 1.50 mm or smaller.

In a vehicular laminated glass according to one mode of implementation of the invention, the second glass plate may be an alkali aluminosilicate glass containing $Al_2O_3$ at 1.0% or more in mole percentage in terms of oxides.

In a vehicular laminated glass according to one mode of implementation of the invention, the second glass plate may be a chemically strengthened glass.

In a vehicular laminated glass according to one mode of implementation of the invention, the second glass plate may be a soda-lime glass containing $Al_2O_3$ at less than 1.0% in mole percentage in terms of oxides.

In a vehicular laminated glass according to one mode of implementation of the invention, the second glass plate may be a borosilicate glass containing $B_2O_3$ at 1.0% or more in mole percentage in terms of oxides.

In a vehicular laminated glass according to one mode of implementation of the invention, the composition of the borosilicate glass of at least one of the first glass plate and the second glass plate may be given as follows in mole percentage in terms of oxides:

85%≤$SiO_2$+$Al_2O_3$+$B_2O_3$≤98%.
60%≤$SiO_2$≤90%,
0%≤$Al_2O_3$≤10%,
1.0%≤$B_2O_3$≤25%,
1.0%≤$R_2O$≤10%,
0%≤RO≤9.0%,
0≤$Li_2O$/$R_2O$≤1.0,
0≤$Na_2O$/$R_2O$≤0.90, and
0≤$K_2O$/$R_2O$≤0.70, where $R_2O$ represents the total content of $Li_2O$, $Na_2O$, and $K_2O$ and RO represents the total content of MgO, CaO, SrO and BaO.

In a vehicular laminated glass according to one mode of implementation of the invention, the composition of the borosilicate glass of at least one of the first glass plate and the second glass plate may be given as follows in mole percentage in terms of oxides:

72%≤$SiO_2$+$Al_2O_3$+$B_2O_3$≤98%,
55%≤$SiO_2$≤80%,
0%≤$Al_2O_3$≤20%,
1.0%≤; $B_2O_3$≤25%,
0%≤$R_2O$≤5.0%, and
0%≤RO≤25%, where $R_2O$ represents the total content of $Li_2O$, $Na_2O$, and $K_2O$ and RO represents the total content of MgO, CaO, SrO and BaO.

In a vehicular laminated glass according to one mode of implementation of the invention, the composition of the alkali aluminosilicate glass of the second glass plate may be given as follows in mole percentage in terms of oxides:

61%≤$SiO_2$≤77%,
1.0%≤$Al_2O_3$≤20%,
0%≤$B_2O_3$≤10%,
0%≤MgO≤15%,
0%≤CaO≤10%,
0%≤SrO≤1.0%,
0%≤BaO≤1.0%,
0%≤$Li_2O$≤15%,
2.0%≤$Na_2O$≤15%,
0%≤$K_2O$≤6.0%,
0%≤$ZrO_2$≤4.0%,
0%≤$TiO_2$≤1.0%,
0%≤$Y_2O_3$≤2.0%,
10%≤$R_2O$≤25%, and
0%≤RO≤20%, where $R_2O$ represents the total content of $Li_2O$, $Na_2O$, and $K_2O$ and RO represents the total content of MgO, CaO, SrO and BaO.

In a vehicular laminated glass according to one mode of implementation of the invention, the intermediate film may be polyvinyl butyral.

In a vehicular laminated glass according to one mode of implementation of the invention, the thickness of the intermediate film may be in a range of 0.30 mm to 1.0 mm.

In a vehicular laminated glass according to one mode of implementation of the invention, no crack that is 5.0 mm or longer may develop when a pin has been collided with the glass under the following measurement conditions:

<Measurement Conditions>
Collision speed V: 40 km/h
Collision angle β: 900
Pin: ultrahard pin
Pin weight: 1.2 g
Pin tip angle: 90°
Pin tip radius: 0.2 mm
Plan-view size of a laminated glass sample: 300 mm×300 mm
Number of repeated tests: 10.

Advantageous Effects of Invention

A vehicular laminated glass according to an embodiment of the invention is high in strength and superior in the radio wave transparency in a high-frequency band of a millimeter-wave radar waves or the like.

DESCRIPTION OF EMBODIMENT

Figure 1:
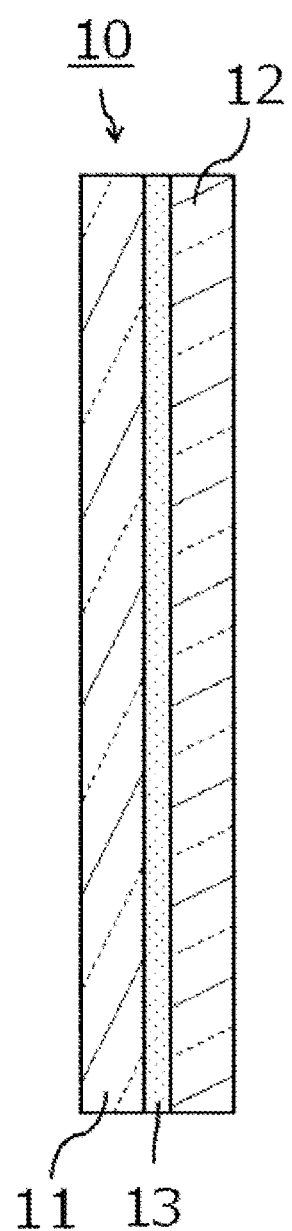
FIG. 1 is a sectional view of an example of a vehicular laminated glass according to an embodiment of the present invention.

An embodiment of the present disclosure will be hereinafter described in detail. Descriptions may be made below with reference to the drawings in such a manner that the same symbols will be given to members or portions as to ones that exhibit the same functions as the former and that redundant descriptions may be omitted or simplified. Furthermore, the embodiment is shown in the drawings in a schematic manner so as to describe the invention clearly and its sizes and scales shown in the drawings do not represent those of an actual product correctly.

In this specification, an evaluation such as "the radio wave (millimeter wave) transparency is high or low" means transparency of radio waves including submillimeter waves and millimeter waves unless otherwise specified and means, for example, radio wave transparency of a vehicular laminated glass in a frequency range of 10 GHz to 90 GHz.

Furthermore, in this specification, unless otherwise specified, a vehicular laminated glass described in the embodiment of the invention is such that when the vehicular laminated glass is installed on or in a vehicle a first glass plate is disposed on the outside of the vehicle (vehicle outside) and a second glass plate is disposed on the inside of the vehicle (compartment side).

A vehicular laminated glass (hereinafter also referred to simply as a laminated glass) according to the embodiment of the invention includes a first glass plate, a second glass plate, and an intermediate film sandwiched between the first glass plate and the second glass plate and the total thickness of the first glass plate, the second glass plate, and the intermediate film is 4.0 mm or larger. The first glass plate is a borosilicate glass containing $B_2O_3$ at 1.0% or more in mole percentage in terms of oxides. And a transmission characteristic S21 that is obtained when TM radio waves having a frequency of 79 GHz enter the vehicular laminated glass from the side of the first glass plate at an incident angle of 60° is −4.0 dB or larger.

A transmission characteristic S21 that is obtained when TM radio waves having a frequency of 79 GHz enter the vehicular laminated glass from the side of the first glass plate at an incident angle of 67.5° may be −3.1 dB or larger. Furthermore, a transmission characteristic S21 that is obtained when TM radio waves having a frequency 28 GHz enter the vehicular laminated glass from the side of the first glass plate at an incident angle in a range of 0° to 700 may be −2.0 dB or larger. Still further, a transmission characteristic S21 that is obtained when TM radio waves having a frequency 28 GHz enter the vehicular laminated glass from the side of the first glass plate at an incident angle of 67.5° may be −0.28 dB or larger.

Moreover, a transmission characteristic S21 that is obtained when TM radio waves having a frequency of 79 GHz enter the vehicular laminated glass from the side of the first glass plate at one or both of incident angles of 200 and 450 may be −4.0 dB or larger.

[Vehicular Laminated Glass]

FIG. 1 is a view showing an example of a vehicular laminated glass 10 according to the embodiment of the invention. The vehicular laminated glass 10 has a first glass plate 11, a second glass plate 12, and an intermediate film 13 sandwiched between the first glass plate 11 and the second glass plate 12.

The vehicular laminated glass 10 according to the embodiment is not limited to the mode of implementation shown in FIG. 1 and may be modified without departing from the gist of the invention. For example, the intermediate film 13 may be formed by either of a single layer or two or more layers. Alternatively, the vehicular laminated glass 10 according to the embodiment may have three or more glass plates, in such a case an organic resin or the like may be inserted between adjacent glass plates.

The following description will be made with an assumption that the vehicular laminated glass 10 according to the embodiment has only two glass plates, that is, the first glass plate 11 and the second glass plate 12, and the intermediate film 13 is sandwiched between them.

In the vehicular laminated glass 10 according to the embodiment, the total thickness of the first glass plate 11, the second glass plate 12, and the intermediate film 13 is 4.0 mm or larger. The total thickness being 4.0 mm or larger makes it possible to obtain sufficient strength and increases the chipping resistance of a windshield and the stiffness of a vehicle.

It is preferable that the total thickness be 4.2 mm or larger, even preferably 4.4 mm or larger and further preferably 4.6 mm or larger. Furthermore, from the viewpoint of increase in radio wave transparency and weight reduction, it is preferable that the total thickness be 13 mm or smaller, even preferably 12 mm or smaller, further preferably 10 mm or smaller, even further preferably 8.0 mm or smaller, particularly preferably 6.0 mm or smaller, and most preferably 5.0 mm or smaller.

In the vehicular laminated glass 10 according to the embodiment, the first glass plate 11 is a borosilicate glass containing $B_2O_3$ at 1.0% or more in mole percentage in terms of oxides.

Since the borosilicate glass is highly strong against flying stones and superior in radio wave transparency, in the case where the first glass plate 11 is the borosilicate glass the vehicular laminated glass 10 becomes highly strong against flying stones and can be increased in radio wave transparency.

The borosilicate glass is an oxide glass having silicon dioxide as a main component and having a boron component. The boron component in the borosilicate glass is boron oxide (a generic term of boron oxides such as diboron trioxide ($B_2O_3$)) and a proportion of boron oxide in the glass is represented by a value as converted to $B_2O_3$. Likewise, main components in the glass are represented by oxides such as $SiO_2$, $Al_2O_3$, $B_2O_3$, $MgO$, $CaO$, $SrO$, $BaO$, $LiO_2$, $Na_2O$, and $K_2O$ and their proportions are represented in terms of oxides.

In the embodiment, the borosilicate glass means oxide glass having silicon dioxide as a main component and having $B_2O_3$ at 1.0% or more in mole percentage in terms of oxides as mentioned above.

In the vehicular laminated glass 10 according to the embodiment, a transmission characteristic S21 that is obtained when TM radio waves having a frequency of 79 GHz enter it from the side of the first glass plate 11 at an incident angle of 600 may be −4.0 dB or larger.

Furthermore, in the vehicular laminated glass 10 according to the embodiment, it is preferable that a transmission characteristic S21 that is obtained when TM radio waves having a frequency of 79 GHz enter it from the side of the first glass plate 11 at one or both of incident angles of 200 and 450 be −4.0 dB or larger.

It is noted that in the vehicular laminated glass 10 according to the embodiment the above-mentioned transmission characteristic S21 is also a characteristic that is obtained when radio waves having the same frequency enter from the side of the second glass plate 12 at the same angle. In this specification, the transmission characteristic S21 of the vehicular laminated glass 10 will be described for the case that millimeter waves having a prescribed frequency enter from the side of the first glass plate 11.

Incidentally, when a communication is made with the outside of an automobile through a window glass using a millimeter-wave radar device installed inside the automobile, the angle, for example, at which radio waves are incident on the windshield surface varies depending on the structure of the window glass, a communication target, the elevation angle in a traveling direction of the millimeter-wave radar waves, and other factors.

However, in view of the inclination angle of a windshield with respect to the horizontal plane in common automobiles, about 600 can be employed as a measure of the incident angle of millimeter-wave radar waves incident on the windshield surface. In this case, millimeter waves may be, for example, TM waves having a frequency of 79 GHz and an S21 parameter (also referred to as a transmission characteristic S21 or simply S21) is important as an index of millimeter wave transparency of the vehicular window glass. Likewise, an incident angle in the vicinity of 600 (e.g., 67.5°) of millimeter waves is also useful in evaluating the transmission characteristic S21.

Depending on the type of automobiles, a case may occur that the incident angle, on the windshield surface, of millimeter-wave radar waves is equal to about 20° or 45°. Thus, to enable application to automobiles whose windshields are attached at different angles, these incident angles are also useful in evaluating the S21 characteristic.

It is noted that the evaluation of the above-mentioned transmission characteristic S21 will be described with a condition that millimeter-wave radar waves proceed to a direction that is parallel to the horizontal plane.

The transmission characteristic S21 means an insertion loss that is derived on the basis of the relative permittivity $\varepsilon_r$ and the dielectric tangent tan $\delta$ ($\delta$: loss angle) of each material that is used for a laminated glass, and the transmission characteristic S21 means higher radio wave transparency as its absolute value decreases.

In the vehicular laminated glass 10 according to the embodiment, a transmission characteristic S21 that is obtained when TM radio waves having a frequency of 79 GHz enter the first glass plate 11 at an incident angle of 600 may be −4.0 dB or larger.

In the vehicular laminated glass 10, it is preferable that a transmission characteristic S21 that is obtained when TM radio waves having a frequency of 79 GHz enter the first glass plate 11 at an incident angle of 60° be −3.0 dB or larger, even preferably −2.5 dB or larger, further preferably −2.0 dB or larger, and particularly preferably −1.8 dB or larger.

Although there are no particular limitations on the upper limit of the transmission characteristic S21 obtained under the above conditions, the transmission characteristic S21 should be −0.50 dB or smaller, for example.

Furthermore, in the vehicular laminated glass 10 according to the embodiment, it is preferable that a transmission characteristic S21 that is obtained when TM radio waves having a frequency of 79 GHz enter the first glass plate 11 at an incident angle of 67.5° be −3.1 dB or larger.

It is even preferable that a transmission characteristic S21 that is obtained when TM radio waves having a frequency of 79 GHz enter the first glass plate 11 at an incident angle of 67.5° be −2.5 dB or larger, further preferably −2.0 dB or larger, and particularly preferably −1.8 dB or larger.

Although there are no particular limitations on the upper limit of the transmission characteristic S21 obtained under the above conditions, the transmission characteristic S21 should be −0.50 dB or smaller, for example.

Still further, in the vehicular laminated glass 10 according to the embodiment, a transmission characteristic S21 that is obtained when TM radio waves having a frequency of 79 GHz enter the first glass plate 11 at an incident angle of 20° may be −4.0 dB or larger.

In the vehicular laminated glass 10, it is preferable that the transmission characteristic S21 that is obtained when TM radio waves having a frequency of 79 GHz enter the first glass plate 11 at an incident angle of 200 be −3.0 dB or larger, even preferably −2.5 dB or larger, further preferably −2.0 dB or larger, and particularly preferably −1.8 dB or larger.

Although there are no particular limitations on the upper limit of the transmission characteristic S21 obtained under the above conditions, the transmission characteristic S21 should be −0.50 dB or smaller, for example.

Moreover, in the vehicular laminated glass 10 according to the embodiment, a transmission characteristic S21 that is obtained when TM radio waves having a frequency of 79 GHz enter the first glass plate 11 at an incident angle of 450 may be −4.0 dB or larger.

In the vehicular laminated glass 10, it is preferable that the transmission characteristic S21 that is obtained when TM radio waves having a frequency of 79 GHz enter the first glass plate 11 at an incident angle of 450 be −3.0 dB or larger, even preferably −2.5 dB or larger, further preferably −2.0 dB or larger, and particularly preferably −1.8 dB or larger.

Although there are no particular limitations on the upper limit of the transmission characteristic S21 obtained under the above conditions, the transmission characteristic S21 should be −0.50 dB or smaller, for example.

In the vehicular laminated glass 10 according to the embodiment, the transmission characteristic S21 that is obtained when TM waves having a frequency 28 GHz enter the first glass plate 11 is also useful as an index of millimeter wave transparency of a vehicular window glass. It is noted that also in this evaluation a condition is set that the main lobe of a radio communication having a frequency 28 GHz proceeds to a direction that is parallel to the horizontal plane.

In the vehicular laminated glass 10 according to the embodiment, it is preferable that a transmission characteristic S21 that is obtained when TM radio waves having a frequency 28 GHz enter the first glass plate 11 at an incident angle of 0° to 700 be −2.0 dB or larger.

In the vehicular laminated glass 10, it is even preferable that the transmission characteristic S21 that is obtained when TM radio waves having a frequency 28 GHz enter the first glass plate 11 at an incident angle of 0° to 700 be −1.5 dB or larger, further preferably −1.0 dB or larger, and particularly preferably −0.70 dB or larger.

Although there are no particular limitations on the upper limit of the transmission characteristic S21 obtained under the above conditions, the transmission characteristic S21 should be −0.30 dB or smaller, for example.

Furthermore, in the vehicular laminated glass 10 according to the embodiment, it is preferable that a transmission characteristic S21 that is obtained when TM radio waves having a frequency 28 GHz enter the first glass plate 11 at an incident angle of 67.5° be −0.28 dB or larger.

In the vehicular laminated glass 10, it is even preferable that the transmission characteristic S21 that is obtained when TM radio waves having a frequency 28 GHz enter the first glass plate 11 at an incident angle of 67.5° be −0.24 dB or larger, further preferably −0.20 dB or larger.

Although there are no particular limitations on the upper limit of the transmission characteristic S21 obtained under the above conditions, the transmission characteristic S21 should be −0.10 dB or smaller, for example.

Since the first glass plate 11 is a borosilicate glass, the vehicular laminated glass 10 can realize high strength also against external impact. For example, the strength of the vehicular laminated glass 10 can be evaluated by an impact resistance test shown in FIG. 2A.

Figure 2A:
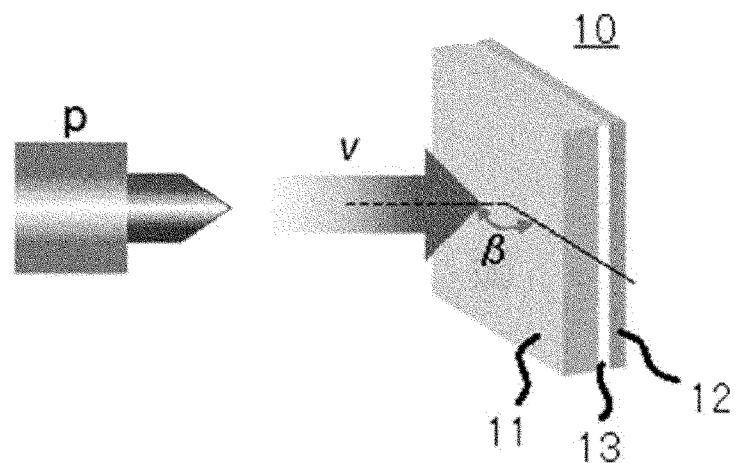
FIG. 2A is a schematic diagram showing a method of an impact resistance test for evaluating the chipping resistance.

Specifically, an evaluation can be made on the basis of whether cracks whose length is 5.0 mm or longer develop when as shown in FIG. 2A a pin P is collided with a sample laminated glass under conditions of a collision speed V: 40 (km/h) and a collision angle β: 900 (see the following measurement conditions 1). A laminated glass is judged to be high in strength in the case where no crack of 5.0 mm or longer develops.

Figure 2B:
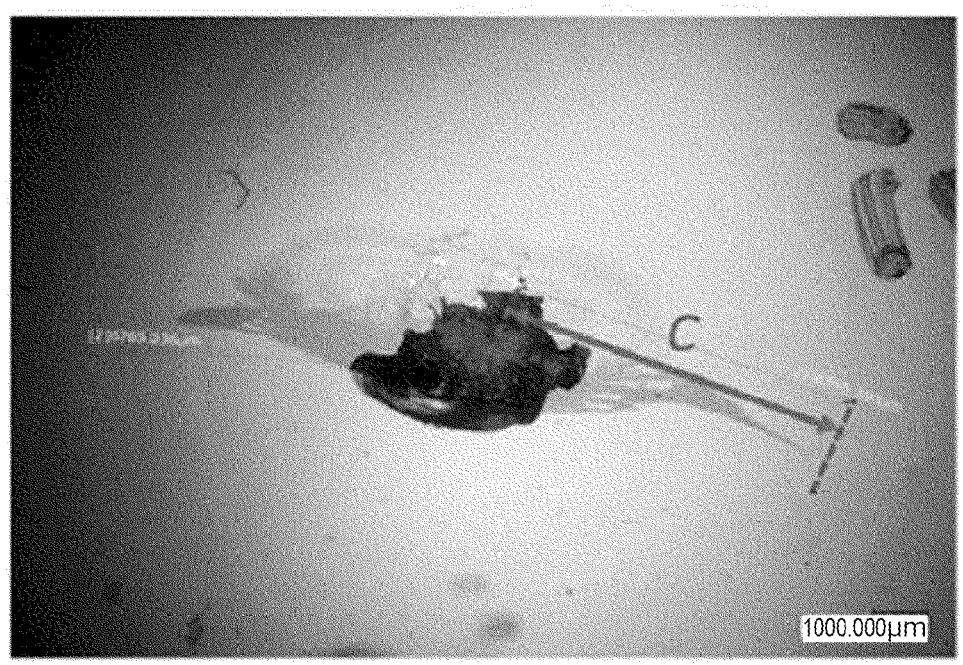
FIG. 2B is a photograph showing examples of cracks that occurred in a laminated glass as a result of an impact resistance test.

In connection with the above passage, as shown in FIG. 2B the "length of cracks" means a maximum length of straight-line distances from a start point (the center (collision point) of the dent) to end points (the tips of the cracks) in radial directions of cracks that develop in radial directions (i.e., directions perpendicular to the glass thickness direction) from a dent formed by a collision.

<Measurement Conditions 1>
  Collision speed V: 40 km/h
  Collision angle β: 900
  Pin: ultrahard pin
  Pin weight: 1.2 g
  Pin tip angle: 900
  Pin tip radius: 0.2 mm
  Plan-view size of a laminated glass sample: 300 mm×300 mm
  Number of repeated tests: 10

An evaluation can also be made by measuring a collision speed V km/h at which the length of cracks developing in a target laminated glass becomes equal to 5.0 mm when the pin is collided with the laminated glass under the following measurement conditions 2:

<Measurement Conditions 2>
  Collision speed V: 40, 60 km/h
  Collision angle β: 90°
  Pin: ultrahard pin
  Pin weight: 1.2 g
  Pin tip angle: 90°
  Pin tip radius: 0.2 mm
  Plan-view size of a laminated glass sample: 300 mm×300 mm
  Number of repeated tests: 10

It is noted here that the collision speed V and the length of cracks have a linear relationship. Thus, a pin collision speed V km/h at which the length of cracks becomes equal to 5.0 mm can be calculated by measuring a length of cracks of a case that the collision speed V is equal to 40 km/h and a length of cracks of a case that the collision speed V is equal to 60 km/h.

In the vehicular laminated glass 10 according to the embodiment, it is preferable that the collision speed V at which a length of cracks is measured to be 5.0 mm be 45 km/h or higher, even preferably 50 km/h or higher and further preferably 55 km/h or higher. Where that collision speed V is 45 km/h or higher, strength can be realized that is high enough against external impact caused by flying stones or the like to be received during running.

In the following, individual members constituting the vehicular laminated glass 10 according to the embodiment will be described in detail.

[First Glass Plate, Second Glass Plate]

The first glass plate 11 is a borosilicate glass that contains $B_2O_3$ at 1.0% or more in mole percentage in terms of oxides. As mentioned above, the borosilicate glass is high in strength and superior in radio wave (millimeter wave) transparency.

It is preferable that the first glass plate 11 and the second glass plate 12 be both the borosilicate glass. It is even preferable that the first glass plate 11 and the second glass plate 12 be the borosilicate glass and are the same in composition.

In the borosilicate glass employed in the embodiment, from the viewpoint of increase in the strength against flying stones or increase in radio wave (millimeter wave) transparency that is associated with realization of a low permittivity and a small dielectric tangent, the content of $B_2O_3$ in mole percentage in terms of oxides may be 2.0% or more, even preferably 5.0% or more and further preferably 7.0% or more.

Furthermore, if the content of $B_2O_3$ is too high, the borosilicate glass becomes prone to lower in acid resistance or alkali resistance or alkali elements may become prone to volatilize during melting/shaping in the case of an alkali-containing composition, possibly causing reduction in glass quality. Thus, the borosilicate glass may contain $B_2O_3$ at 22% or less, preferably 20% or less and even preferably 15% or less.

In the borosilicate glass employed in the embodiment, the contents of alkali components (i.e., oxides of alkali metals such as lithium, sodium, and potassium) being small is preferable from the viewpoint of increasing the radio wave (millimeter wave) transparency.

For example, it is preferable that the total content of alkali components in the borosilicate glass in mole percentage in terms of oxides be 10% or less, even preferably 7.0% or less, further preferably 5.0% or less, particularly preferably 4.0% or less, and most preferably 3.0% or less. Glass (alkali-free glass) in which the above total content is 0.10% or less can be used preferably as the borosilicate glass.

Furthermore, in the borosilicate glass employed in the embodiment, although there are no particular limitations on components other than alkali components and $B_2O_3$, it is preferable that the contents of individual components in mole percentage in terms of oxides be, for example, $50\% \leq SiO_2 \leq 90\%$,
  $0\% \leq Al_2O_3 \leq 20\%$,
  $0\% \leq MgO \leq 15\%$,
  $0\% \leq CaO \leq 15\%$,
  $0\% \leq SrO \leq 10\%$,
  $0\% \leq BaO \leq 10\%$, and
  $0\% \leq RO \leq 25\%$, where RO represents the total content of MgO, CaO, SrO, and BaO.

For example, glass having each of the following compositions (hereinafter also referred to as "composition A," "composition B," and "composition C") can be used as the borosilicate glass employed in the embodiment. Glass having each of the composition A, the composition B, and the composition C will be described below in detail.

(Glass Having Composition A)

The glass having the composition A is a glass in which the contents of respective components in mole percentage in terms of oxides satisfy the following relationship:

80%≤$SiO_2$+$Al_2O_3$+$B_2O_3$≤98%,
60%≤$SiO_2$≤90%,
0%≤$Al_2O_3$≤10%,
1.0%≤$B_2O_3$≤25%,
1.0%≤$R_2O$≤10%,
0%≤RO≤9.0%,
0≤$Li_2O$/$R_2O$≤1.0,
0≤$Na_2O$/$R_2O$≤0.90, and
0 s $K_2O$/$R_2O$≤0.70, where $R_2O$ represents the total content of $Li_2O$, $Na_2O$, and $K_2O$ and RO represents the total content of MgO, CaO, SrO and BaO.

The glass having the composition A will be described below in detail.

It is preferable that the specific gravity of the glass having the composition A be 2.0 or larger and 2.5 or smaller. It is preferable that the Young's modulus of the glass having the composition A be 50 GPa or larger and 80 GPa or smaller. And it is preferable that the average linear expansion coefficient from 50° C. to 350° C. of the glass having the composition A be 25×$10^{-7}$/K or larger and 90×$10^{-7}$/K or smaller. The glass having the composition A that satisfies these conditions can be used satisfactorily as a vehicular laminated glass.

To secure necessary weatherability, it is preferable that the glass having the composition A contain $SiO_2$ at a certain content or more, as a result of which the specific gravity of the glass having the composition A can be 2.0 or larger. It is preferable that the specific gravity of the glass having the composition A be 2.1 or larger.

Where the specific gravity of the glass having the composition A is 2.5 or smaller, it is less prone to be brittle and can be reduced in weight. It is preferable that the specific gravity of the glass having the composition A be 2.4 or smaller.

Where the Young's modulus of the glass having the composition A is large, it becomes high in stiffness and hence more suitable for a vehicular window glass etc. It is preferable that the Young's modulus of the glass having the composition A be 55 GPa or larger, even preferably 60 GPa or larger and further preferably 62 GPa or larger.

On the other hand, if the contents of $Al_2O_3$ and/or MgO are increased to increase the Young's modulus, the glass is increased in permittivity and dielectric tangent. Thus, a proper Young's modulus range of the glass having the composition A is 75 GPa or smaller, preferably 70 GPa or smaller and even preferably 68 GPa or smaller.

It is preferable that the glass having the composition A be small in average linear expansion coefficient because in that case the generation of thermal stress resulting from a temperature distribution of a glass plate is suppressed and hence the glass plate becomes less prone to thermal cracking.

It is preferable that the average linear expansion coefficient from 50° C. to 350° C. of the glass having the composition A be 20×$10^{-7}$/K or larger, even preferably 25×$10^{-7}$/K or larger and further preferably 28×$10^{-7}$/K or larger.

On the other hand, if the average linear expansion coefficient of the glass having the composition A is too large, thermal stress is prone to occur due to a temperature distribution of a glass plate to possibly cause thermal cracking of the glass plate in a glass plate shaping step, a gradual cooling step, or a windshield shaping step. In addition, if the average linear expansion coefficient of the glass having the composition A is too large, the expansion difference between a glass plate and a support member or the like may become too large and generate distortion, possibly resulting in breaking of the glass plate.

It is preferable that the average linear expansion coefficient from 50° C. to 350° C. of the glass having the composition A be 45×$10^{-7}$/K or smaller, even preferably 40×$10^{-7}$/K or smaller, further preferably 38×$10^{-7}$/K or smaller, even further preferably 36×$10^{-7}$/K or smaller, particularly preferably 34×$10^{-7}$/K or smaller, and most preferably 32×$10^{-7}$/K or smaller.

It is preferable that $T_2$ of the glass having the composition A be 1,900° C. or lower, $T_4$ of the glass having the composition A be 1,350° C. or lower, and $T_4$-$T_L$ of it be −50° C. or larger.

In this specification, $T_2$ represents a temperature at which the glass viscosity becomes $10^2$ dPa·s, $T_4$ represents a temperature at which the glass viscosity becomes $10^4$ dPa·s, and $T_L$ represents a liquidus temperature.

If $T_2$ or $T_4$ of the glass having the composition A is higher than the above prescribed temperature, it becomes difficult to manufacture a large glass plate by a float method, a rollout method, a down draw method, or the like.

It is preferable that $T_2$ of the glass having the composition A be 1,850° C. or lower, even preferably 1,800° C. or lower.

It is preferable that $T_4$ of the glass having the composition A be 1,300° C. or lower, even preferably 1,250° C. or lower.

Although there are no particular limitations on the lower limits of $T_2$ and $T_4$ of the glass having the composition A, to maintain necessary weatherability and glass specific gravity, $T_2$ and $T_4$ should typically be 1,200° C. or higher and 800° C. or higher, respectively.

It is preferable that $T_2$ of the glass having the composition A be 1,300° C. or higher, even preferably 1,400° C. or higher.

It is preferable that $T_4$ of the glass having the composition A be 900° C. or higher, even preferably 1,000° C. or higher.

Furthermore, to enable manufacture by a float method, it is preferable that $T_4$-$T_L$ of the glass having the composition A be −50° C. or larger. If this difference is smaller than −50° C., devitrification occurs in the glass during glass shaping to cause such problems as lowering of the mechanical properties of the glass and reduction of its transparency, which may make it difficult to obtain high-quality glass.

It is even preferable that $T_4$-$T_L$ of the glass having the composition A be 0° C. or larger, further preferably +20° C. or larger.

Furthermore, it is preferable that $T_g$ of the glass having the composition A be 400° C. or higher and 650° C. or lower. In this specification, $T_g$ represents a glass transition temperature of glass. Where $T_g$ is in this prescribed temperature range, glass bend working can be performed in ordinary manufacturing condition ranges. If $T_g$ of the glass having the composition A is lower than 400° C., whereas there are no problems in shaping performance, the alkali content or the alkali earth content may become so high as to cause such problems as excessive thermal expansion of the glass and reduction in weatherability. Furthermore, if $T_g$ of the glass having the composition A is lower than 400° C., devitrification may occur in a shaping temperature range to disable shaping.

It is even preferable that $T_g$ of the glass having the composition A be 450° C. or higher, further preferably 470° C. or higher and particularly preferably 490° C. or higher.

On the other hand, if $T_g$ is too high, a high temperature is required at the time of glass bend working to make it difficult to perform manufacture. It is even preferable that $T_g$ of the glass having the composition A be 600° C. or lower, further preferably 550° C. or lower.

Furthermore, tan δ of the glass having the composition A is made small by adjusting its composition, whereby its dielectric loss is lowered and high radio wave (millimeter wave) transmittance can thereby be attained. The relative permittivity of the glass having the composition A can be adjusted by, likewise, adjusting its composition, whereby the reflection of radio waves at the interface(s) with the intermediate film is suppressed and high radio wave (millimeter wave) transmittance can thereby be attained.

Still further, it is even preferable that the relative permittivity at 10 GHz of the glass having the composition A be 6.00 or lower. Where its relative permittivity at 10 GHz is 6.00 or lower, the difference in relative permittivity from the intermediate film is decreased, whereby the reflection of radio waves at the interface(s) with the intermediate film can be suppressed.

It is even preferable that the relative permittivity at 10 GHz of the glass having the composition A be 5.50 or lower, further preferably 5.00 or lower, even further preferably 4.75 or lower, particularly preferably 4.50 or lower, and most preferably 4.40 or lower.

Although there are no particular limitations on the lower limit of the relative permittivity at 10 GHz of the glass having the composition A, its relative permittivity at 10 GHz should be 3.80 or higher, for example.

Furthermore, it is preferable that the dielectric tangent at 10 GHz of the glass having the composition A be 0.010 or smaller. Where its dielectric tangent at 10 GHz is 0.010 or smaller, the radio wave transmittance can be increased.

It is even preferable that the dielectric tangent at 10 GHz of the glass having the composition A be 0.0090 or smaller, further preferably 0.0085 or smaller, even further preferably 0.0080 or smaller, particularly preferably 0.0075 or smaller, and most preferably 0.0070 or smaller.

Although there are no particular limitations on the lower limit of the dielectric tangent at 10 GHz of the glass having the composition A, it should be 0.0030 or larger, for example.

Where the relative permittivity and the dielectric tangent at 10 GHz of the glass are in the above ranges, high radio wave (millimeter wave) transmittance can be attained even in a 10 to 90 GHz range.

The relative permittivity and the dielectric tangent at 10 GHz of glass can be measured by, for example, a split post dielectric resonator method (SPDR method). To perform such a measurement, for example, a split post dielectric resonator of a type having a nominal fundamental frequency 10 GHz produced by QWED Company, a vector network analyzer E8361C produced by Keysight Technologies, and 85071E Option 300 Permittivity Calculation Software produced by Keysight Technologies can be used.

Furthermore, the content of $SiO_2$ in the glass having the composition A in mole percentage in terms of oxides should be 60% or more and 90% or less.

On the other hand, the content of $Al_2O_3$ in the glass having the composition A should be 0% or more and 10% or less.

In the glass having the composition A, $SiO_2$ and $Al_2O_3$ contributes to increase of the Young's modulus and thereby makes it easier to secure strength that is necessary for vehicular use, construction use, etc. If the $Al_2O_3$ content and/or the $SiO_2$ content of the glass having the composition A is low, it becomes difficult to secure necessary weatherability and the average linear expansion coefficient may become so large that a glass plate suffers thermal cracking. On the other hand, if the $Al_2O_3$ content and/or the $SiO_2$ in the glass having the composition A is too high, the viscosity increases at the time of glass melting to possibly make glass manufacture difficult. In addition, in the glass having the composition A, the radio wave (millimeter wave) transmittance may become low if the $Al_2O_3$ content is too high.

It is preferable that the $SiO_2$ content of the glass having the composition A be 65% or more, even preferably 70% or more, further preferably 75% or more, and particularly preferably 80% or more.

It is preferable that the $SiO_2$ content of the glass having the composition A be 88% or less, even preferably 86% or less, further preferably 84% or less, and particularly preferably 82% or less.

To suppress phase separation of the glass and improve the weatherability, it is preferable that the $Al_2O_3$ content of the glass having the composition A be 0.10% or more, even preferably 0.50% or more and further preferably 1.0% or more.

From the viewpoints of facilitating manufacture of the glass by keeping $T_2$ low and increasing the radio wave (millimeter wave) transmittance, it is preferable that the $Al_2O_3$ content of the glass having the composition A be 5.0% or less, even preferably 3.0% or less and further preferably 2.0% or less.

The content of $B_2O_3$ in the glass having the composition A may be 1.0% or more and 25% or less. $B_2O_3$ is added to increase the glass strength and the radio wave (millimeter wave) transparency as mentioned above, and contributes to increase of meltability.

It is preferable that the $B_2O_3$ content of the glass having the composition A be 5.0% or more, even preferably 7.0% or more and further preferably 9.0% or more.

On the other hand, if the $B_2O_3$ content of the glass having the composition A is too high, alkali elements may become prone to volatilize during melting/shaping to lower the glass quality. Furthermore, if the $B_2O_3$ content of the glass having the composition A is too high, the acid resistance or alkali resistance may lower. It is preferable that the $B_2O_3$ content of the glass having the composition A be 20% or less, even preferably 15% or less, further preferably 13% or less, and particularly preferably 11% or less.

To increase the radio wave (millimeter wave) transmittance, $SiO_2+Al_2O_3+B_2O_3$, that is, the sum of the $SiO_2$ content, the $Al_2O_3$ content, and the $B_2O_3$ content, of the glass having the composition A may be 80% or more and 98% or less.

If making glass manufacture easier by keeping the temperatures $T_2$ and $T_4$ of the glass having the composition A low is further taken into consideration, it is preferable that its $SiO_2+Al_2O_3+B_2O_3$ be 97% or less, even preferably 96% or less.

However, if $SiO_2+Al_2O_3+B_2O_3$ of the glass having the composition A is too small, the weatherability may lower, and the relative permittivity and the dielectric tangent may become too large. Thus, it is therefore preferable that $SiO_2+Al_2O_3+B_2O_3$ of the glass having the composition A be 85% or more, even preferably 90% or more.

The MgO content of the glass having the composition A may be 0% or more and 9.0% or less. MgO is a component for accelerating melting of glass materials and increasing the weatherability and the Young's modulus.

The glass having the composition A may contain MgO. Where it contains MgO, it is preferable that the MgO content be 0.10% or more, even preferably 0.50% or more and further preferably 1.0% or more.

Where the MgO content is 9.0% or less, the glass having the composition A is less prone to devitrify and increase of the relative permittivity and the dielectric tangent can be suppressed. It is preferable that the MgO content of the glass having the composition A be 8.0% or less, even preferably 6.0% or less, further preferably 4.0% or less, particularly preferably 3.0% or less, and most preferably 2.0% or less.

The glass having the composition A may contain CaO, SrO, and/or BaO at a certain content(s) to increase the meltability of glass materials. It is preferable that the CaO content be 0% or more and 9.0% or less. It is preferable that the SrO content of the glass having the composition A be 0% or more and 3.0% or less. It is preferable that the BaO content of the glass having the composition A be 0% or more and 3.0% or less.

Where the glass having the composition A contains CaO, SrO, and/or BaO, it is preferable that its or their content be 0.10% or more, even preferably 0.50% or more, and further preferably 1.0% or more. In this case, the meltability of glass materials and the ease of shaping (reduction of $T_2$ and $T_4$) are increased.

In the glass having the composition A, increase of the specific gravity of the glass having the composition A can be avoided and its low brittleness and strength can be maintained by setting the CaO content, SrO content, and BaO content 9.0% or less, 3.0% or less, and 3.0% or less, respectively.

To prevent the glass from becoming brittle and to prevent increase of the relative permittivity and the dielectric tangent of the glass, it is preferable that the CaO content of the glass having the composition A be 8.0% or less, even preferably 6.0% or less, further preferably 4.0% or less, particularly preferably 3.0% or less, and most preferably 2.0% or less.

It is even preferable that the SrO content of the glass having the composition A be 2.0% or less, further preferably 1.0% or less, and particularly preferably 0.50% or less. It is most preferable that the glass having the composition A contain substantially no SrO.

It is even preferable that the BaO content of the glass having the composition A be 2.0% or less, further preferably 1.0% or less, and particularly preferably 0.50% or less. It is most preferable that the glass having the composition A contain substantially no BaO.

It is noted that the expression "to contain substantially no certain component" means that the component concerned is not added positively except for a case that it is mixed unavoidably as an impurity.

In this specification, "RO" represents the sum of contents of MgO, CaO, SrO, and BaO. In the glass having the composition A, RO should be 0% or more and 9.0% or less. Where RO of the glass having the composition A is 9.0% or less, the weatherability is increased and increase of the relative permittivity and the dielectric tangent can be suppressed.

It is preferable that RO of the glass having the composition A be 8.0% or less, even preferably 6.0% or less, further preferably 4.0% or less, particularly preferably 3.0% or less, and most preferably 2.0% or less.

The glass having the composition A may have a certain RO value from the viewpoint of lowering the temperatures $T_2$ and $T_4$ in manufacture or increasing the Young's modulus. Where the glass having the composition A has a certain RO value, it is preferable that RO be 0.10% or more, even preferably 0.50% or more, and particularly preferably 1.0% or more.

Furthermore, in the glass having the composition A, the $Li_2O$ content may be 0% or more and 10% or less. $Li_2O$ is a component for increasing the meltability of glass as well as a component for making it easier to increase the Young's modulus and thereby contributing to increase of the strength of glass. Where the glass having the composition A contains $Li_2O$, the viscosity of the glass lowers and hence the ease of shaping into a windshield is increased.

Where the glass having the composition A contains $Li_2O$, its content may be 0.10% or more, preferably 1.0% or more, even preferably 2.0% or more, and further preferably 3.0% or more.

On the other hand, if the $Li_2O$ content of the glass having the composition A is too high, devitrification or phase separation may occur during glass manufacture to make the manufacture difficult. Furthermore, in the glass having the composition A, a high content of $Li_2O$ may cause increase of a material cost and increase of the relative permittivity and the dielectric tangent. Thus, it is preferable that the $Li_2O$ content of the glass having the composition A be 8.0% or less, even preferably 7.0% or less, further preferably 6.0% or less, and particularly preferably 5.0% or less.

The content of $Na_2O$ in the glass having the composition A may be 0% or more and 10% or less. $Na_2O$ is a component for increasing the meltability of glass, and it is preferable that $Na_2O$ be contained at 0.10% or more. This makes it easier to suppress $T_2$ and $T_4$ of the glass having the composition A to 1,900° C. or lower and 1,350° C. or lower, respectively. In addition, where the glass having the composition A contains $Na_2O$, the viscosity of the glass lowers and hence the ease of shaping into a windshield is increased.

It is preferable that the $Na_2O$ content of the glass having the composition A be 0.50% or more, even preferably 1.0% or more and further preferably 2.0% or more.

On the other hand, in the glass having the composition A, too high content of $Na_2O$ is a cause of increase of the relative permittivity and the dielectric tangent and makes the average linear expansion coefficient so large as to render thermal cracking of a glass plate prone to occur. It is preferable that the $Na_2O$ content of the glass having the composition A be 8.0% or less, even preferably 6.0% or less, further preferably 4.0% or less, and most preferably 3.0% or less.

The content of $K_2O$ in the glass having the composition A may be 0% or more and 10% or less. In the glass having the composition A, $K_2O$ is a component for increasing the meltability of the glass and it is preferable that $K_2O$ be contained at 0.10% or more. This makes it easier to suppress $T_2$ and $T_4$ of the glass having the composition A to 1,900° C. or lower and 1,350° C. or lower, respectively.

It is even preferable that the $K_2O$ content of the glass having the composition A be 0.30% or more, further preferably 0.60% or more.

On the other hand, in the glass having the composition A, too high content of $K_2O$ is a cause of increase of the relative permittivity and the dielectric tangent and makes the average linear expansion coefficient so large as to render thermal cracking of a glass plate prone to occur. It is preferable that the $K_2O$ content of the glass having the composition A be 8.0% or less, even preferably 5.0% or less, further preferably 3.0% or less, particularly preferably 2.0% or less, and most preferably 1.0% or less.

It is even preferable that the glass having the composition A contain all of $Li_2O$, $Na_2O$, and $K_2O$ because the weatherability can be increased while necessary meltability is maintained. Furthermore, the effect of increasing the radio wave (millimeter wave) transmittance is also expected.

In the glass having the composition A, if the contents of $Li_2O$, $Na_2O$, and/or $K_2O$ are low, the viscosity of the glass becomes so high as to possibly disable shaping into a windshield. Where the contents of $Li_2O$, $Na_2O$, and/or $K_2O$ are set at prescribed values mentioned above, the glass having the composition A can be used as a window material that well matches other members. Furthermore, where the contents of $Li_2O$, $Na_2O$, and/or $K_2O$ are set in the above prescribed ranges, the glass having the composition A is given high radio wave (millimeter wave) transmittance.

In this specification, "$R_2O$" represents a total content of alkali metal oxides. This usually means the sum of contents of $Li_2O$, $Na_2O$, and $K_2O$. $R_2O$ of the glass having the composition A should be 1.0% or more and 10% or less. The weatherability of the glass having the composition A is increased in the case where its $R_2O$ is 10% or less.

It is preferable that $R_2O$ of the glass having the composition A be 8.0% or less, even preferably 7.0% or less, further preferably 6.0% or less, and particularly preferably 5.0% or less.

It is preferable that $R_2O$ be a very small amount from the viewpoint of lowering the temperatures $T_2$ and $T_4$ at the time of manufacture or to facilitate heating of a glass melt by direct conduction of electricity through it. It is preferable that $R_2O$ of the glass having the composition A be 1.0% or more, even preferably 2.0% or more, further preferably 3.0% or more, and particularly preferably 4.0% or more.

Incidentally, in the glass having the composition A, $Na_2O/R_2O$ should be set at 0 or more and 0.90 or less to increase the weatherability and the radio wave (millimeter wave) transmittance. The effects of increasing the weatherability and the radio wave (millimeter wave) transmittance may not be obtained sufficiently if $Na_2O/R_2O$ of the glass having the composition A is either too low or too high.

Where the glass having the composition A contains $Li_2O$, it is preferable that the lower limit of its $Na_2O/R_2O$ be 0.010 or more, even preferably 0.10 or more, further preferably 0.20 or more, and particularly preferably 0.30 or more.

On the other hand, where the glass having the composition A does not contain $Li_2O$, it is better that the lower limit of its $Na_2O/R_2O$ be a little more than in the case where it contains $Li_2O$, preferably 0.010 or more, even preferably 0.20 or more, and further preferably 0.40 or more.

Where the glass having the composition A contains $Li_2O$, it is preferable that the upper limit of its $Na_2O/R_2O$ be 0.80 or less, even preferably 0.60 or less and further preferably 0.40 or less.

On the other hand, where the glass having the composition A does not contain $Li_2O$, it is better that the upper limit of its $Na_2O/R_2O$ be a little more than in the case where it contains $Li_2O$, preferably 0.90 or less, even preferably 0.70 or less, and further preferably 0.55 or less.

$K_2O/R_2O$ of the glass having the composition A should be 0 or more and 0.70 or less to increase the weatherability and the radio wave (millimeter wave) transmittance. The effects of increasing the weatherability and the radio wave (millimeter wave) transmittance may not be obtained sufficiently if $K_2O/R_2O$ is either too low or too high.

Where the glass having the composition A contains $Li_2O$, it is preferable that the lower limit of its $K_2O/R_2O$ be 0.010 or more, even preferably 0.10 or more, further preferably 0.20 or more, and particularly preferably 0.30 or more.

On the other hand, where the glass having the composition A does not contain $Li_2O$, it is better that the lower limit of its $K_2O/R_2O$ be a little more than in the case where it contains $Li_2O$, preferably 0.010 or more, even preferably 0.20 or more, and further preferably 0.40 or more.

Where the glass having the composition A contains $Li_2O$, it is preferable that the upper limit of its $K_2O/R_2O$ be 0.70 or less, even preferably 0.60 or less and further preferably 0.40 or less.

On the other hand, where the glass having the composition A does not contain $Li_2O$, it is better that the upper limit of its $K_2O/R_2O$ be a little more than in the case where it contains $Li_2O$, preferably 0.70 or less, even preferably 0.60 or less.

$Li_2O/R_2O$ of the glass having the composition A may be 0 or more and 1.0 or less to increase the weatherability and the radio wave (millimeter wave) transmittance. $Li_2O$ is more in the effect of increasing the radio wave (millimeter wave) transparency than $Na_2O$ and $K_2O$ are and, from the viewpoint of this effect, it is preferable that $Li_2O/R_2O$ be high.

Where the glass having the composition A contains $Na_2O$ and/or $K_2O$, it is preferable that the lower limit of its $Li_2O/R_2O$ be 0.010 or more, even preferably 0.10 or more, further preferably 0.20 or more, and particularly preferably 0.30 or more.

On the other hand, from the viewpoints of increasing the weatherability and suppressing the phase separation, it is preferable that the upper limit of $Li_2O/R_2O$ of the glass having the composition A be 1.0 or less, even preferably 0.90 or less, and further preferably 0.80 or less.

Furthermore, the content of $Fe_2O_3$ in the glass having the composition A may be 0.0010% or more and 1.0% or less. If the $Fe_2O_3$ content of the glass having the composition A is less than 0.0010%, it may not be able to be used for uses that require heat insulation. To manufacture a glass plate, it may become necessary to use expensive materials having low iron contents. Still further, if the $Fe_2O_3$ content of the glass having the composition A is less than 0.0010%, during glass melting an unnecessarily large amount of heat radiation reaches the bottom surface of a melting furnace to impose a load on the melting furnace.

It is preferable that the $Fe_2O_3$ content of the glass having the composition A be 0.0030% or more, even preferably 0.010% or more, further preferably 0.050% or more, and particularly preferably 0.10% or more.

On the other hand, if the $Fe_2O_3$ content of the glass having the composition A is more than 1.0%, during manufacture heat transfer by radiation may be obstructed to render materials difficult to melt. Furthermore, if the $Fe_2O_3$ content of the glass having the composition A is too high, the visible light transmittance lowers, whereby it becomes not suitable for a vehicular window glass.

It is preferable that the $Fe_2O_3$ content of the glass having the composition A be 0.50% or less, even preferably 0.30% or less and further preferably 0.20% or less.

Furthermore, the glass having the composition A may contain $TiO_2$. Where it contains $TiO_2$, the $TiO_2$ content may be 0.0010% or more and 5.0% or less. For example, if the glass having the composition A does not contain $TiO_2$, a foam layer may be formed at the surface of molten glass during manufacture of a glass plate, in which case the temperature of the molten glass is not increased to an intended temperature and hence it becomes difficult to conduct fining, resulting in reduction in productivity. To make the foam layer formed at the surface of molten glass thin or disappear, it is possible to supply, as a defoaming agent, a titanium compound to the foam layer formed at the surface of the molten glass. The titanium compound is taken into the molten glass and comes to exist as $TiO_2$.

It is preferable that the $TiO_2$ content of the glass having the composition A be 0.0050% or more. Since $TiO_2$ exhibits absorption of ultraviolet light, it is preferable to add $TiO_2$ if it is desired to cut ultraviolet light. In this case, it is preferable that the $TiO_2$ content be 0.050% or more, even preferably 0.10% or more.

On the other hand, if the $TiO_2$ content is too high, the liquidus temperature increases, possibly causing devitrification. Furthermore, visible light is absorbed to possibly cause yellow coloration. In view of these, it is preferable that the $TiO_2$ content of the glass having the composition A be 5.0% or less, even preferably 0.50% or less, further preferably 0.20% or less, and particularly preferably 0.10% or less.

If water exists in the glass having the composition A, the glass having the composition A absorbs near infrared light to lower the transmittance of the light in that range, possibly causing a trouble not only in transmission and reception of millimeter-wave radio waves but also when an infrared light emitting device (e.g., laser radar) is used.

In this connection, the content of water in glass can be represented by a β-OH value. It is preferable that the β-OH value of the glass having the composition A be 0.70 $mm^{-1}$ or smaller, even preferably 0.60 $mm^{-1}$ or smaller, further preferably 0.50 $mm^{-1}$ or smaller, and particularly preferably 0.40 $mm^{-1}$ or smaller. The β-OH value is obtained according to the following equation on the basis of a transmittance of glass measured using FT-IR (Fourier transform infrared spectrophotometer):

$$\beta\text{-OH}=(1/X)\log_{10}(T_A/T_B)(mm^{-1})$$

where

X: sample thickness (mm), $T_A$: transmittance (%) at a reference wave number 4,000 $cm^{-1}$, and $T_B$: minimum transmittance (%) around a hydroxyl group absorption wave number 3,600 $cm^{-1}$.

If the glass having the composition A contains water as mentioned above, the glass having the composition A absorbs near infrared light. Thus, to increase the heat insulation, it is preferable that the β-OH value of the glass having the composition A be 0.050 $mm^{-1}$ or larger, even preferably 0.10 $mm^{-1}$ or larger and further preferably 0.15 $mm^{-1}$ or larger.

(Glass Having Composition B and Glass Having Composition C)

In the glass having the composition B, the total content of components $SiO_2$, $B_2O_3$, and $Al_2O_3$ in mole percentage in terms of oxides is 72% or more. The use of the glass having the composition B is preferable because necessary glass strength can be secured easily and, in particular, the chipping resistance against flying stones is increased. The use of the glass having the composition B is also preferable because the radio wave (millimeter wave) transmittance can be kept high.

It is even preferable that the glass having the composition B be a glass (hereinafter also referred to as "the glass having the composition C") in which the contents of respective components in mole percentage in terms of oxides satisfy the following relationship:

72%≤$SiO_2$+$Al_2O_3$+$B_2O_3$≤98%,
55%≤$SiO_2$≤80%,
0%≤$Al_2O_3$≤20%,
1.0%≤$B_2O_3$≤25%,
0%≤$R_2O$≤5.0%, and
0%≤RO≤25%, where $R_2O$ represents the total content of $Li_2O$, $Na_2O$, and $K_2O$ and RO represents the total content of MgO, CaO, SrO and BaO.

Even preferable composition ranges of the glass having the composition C will be described below in detail.

As mentioned above, the content of $SiO_2$+$Al_2O_3$+$B_2O_3$ of the glass having the composition C is 72% or more and 98% or less.

If the content of $SiO_2$+$Al_2O_3$+$B_2O_3$ of the glass having the composition C is less than 72%, the amount of network components constituting the glass is small, as a result of which cracks are prone to develop in the glass. Furthermore, developed cracks are prone to extend long and the radio wave (millimeter wave) transmittance may decrease.

It is preferable that the content of $SiO_2$+$Al_2O_3$+$B_2O_3$ of the glass having the composition C be 74% or more, even preferably 76% or more, further preferably 78% or more, particularly preferably 80% or more, and most preferably 82% or more.

On the other hand, if the glass having the composition C contains too many network components, the glass melting temperature and the glass shaping temperature become high, possibly making it difficult to manufacture a glass plate. Thus, it is preferable that the content of $SiO_2$+$Al_2O_3$+$B_2O_3$ of the glass having the composition C be 97% or less, even preferably 94% or less, further preferably 90% or less, and particularly preferably 88% or less.

From the viewpoint of increasing the radio wave (millimeter wave) transmittance and suppressing development of cracks in the glass and making the lengths of developed cracks less likely to increase, it is preferable that the $SiO_2$ content of the glass having the composition C be 55% or more. It is even preferable that the $SiO_2$ content of the glass having the composition C be 57% or more, further preferably 59% or more, particularly preferably 61% or more, and most preferably 63% or more.

On the other hand, if the $SiO_2$ content of the glass having the composition C is too high, the glass melting temperature and the glass shaping temperature become high, possibly making it difficult to manufacture a glass plate. Thus, it is preferable that the $SiO_2$ content of the glass having the composition C be 80% or less, even preferably 75% or less, further preferably 70% or less, particularly preferably 68% or less, and most preferably 66% or less.

The glass having the composition C may contain $Al_2O_3$ to increase the Young's modulus and improve the weatherability. It is preferable that the $Al_2O_3$ content of the glass having the composition C be 5.0% or more, even preferably 6.0% or more, further preferably 7.0% or more, particularly preferably 8.0% or more, and most preferably 10% or more.

On the other hand, if the $Al_2O_3$ content of the glass having the composition C is too high, the viscosity during glass melting increases to make it difficult to manufacture the glass or the relative permittivity and the dielectric tangent increase to lower the radio wave (millimeter wave) transmittance or cause devitrification. Thus, the $Al_2O_3$ content of the glass having the composition C may be 20% or less, preferably 18% or less, even preferably 16% or less, further preferably 14% or less, particularly preferably 13% or less, and most preferably 12% or less.

As mentioned above, the glass having the composition C is made to contain $B_2O_3$ to increase the meltability and the strength against flying stones and to increase the radio wave (millimeter wave) transmittance. The $B_2O_3$ content of the glass having the composition C should be 1.0% or more and 25% or less.

On the other hand, the $B_2O_3$ content of the glass having the composition C is too high, components in the glass are prone to volatilize during melting/shaping, possibly causing quality degradation of the glass. Thus, it is preferable that the $B_2O_3$ content of the glass having the composition C be 23% or less, even preferably 21% or less, further preferably 19% or less, even further preferably 17% or less, even still further preferably 15% or less, particularly preferably 13% or less, and most preferably 11% or less.

In addition, it is preferable that the $B_2O_3$ content of the glass having the composition C be 2.0% or more, even preferably 4.0% or more, further preferably 5.0% or more, particularly preferably 6.0% or more, and most preferably 7.0% or more.

To increase the radio wave (millimeter wave) transmittance, $SiO_2+Al_2O_3$, that is, the sum of the $SiO_2$ content and the $Al_2O_3$ content, of the glass having the composition C should be 65% or more and 85% or less.

To increase the radio wave (millimeter wave) transmittance with further consideration given to keeping the temperatures $T_2$ and $T_4$ low to make glass manufacture easier, $SiO_2+Al_2O_3$ is desired to be low and is preferably 84% or less. It is even preferable that $SiO_2+Al_2O_3$ of the glass having the composition C be 83% or less, further preferably 82% or less, even further preferably 81% or less, particularly preferably 80% or less, and most preferably 79% or less.

However, if $SiO_2+Al_2O_3$ of the glass having the composition C is too low, the Young' modulus and the weatherability may become small or low and the average linear expansion coefficient possibly becomes too large. Thus, it is preferable that $SiO_2+Al_2O_3$ of the glass having the composition C be 68% or more, even preferably 69% or more, further preferably 70% or more, even further preferably 72% or more, particularly preferably 74% or more, and most preferably 75% or more.

It is preferable that the value $Al_2O_3/B_2O_3$ of the glass having the composition C be 7.0 or less. It is preferable that the value $Al_2O_3/B_2O_3$ of the glass having the composition C be 7.0 or less because in that case the radio wave (millimeter wave) transmittance is increased further. Furthermore, where the value $Al_2O_3/B_2O_3$ of the glass having the composition C is 7.0 or less, the glass becomes easier to be melt and hence $T_2$ and $T_4$ can be easily made 1,750° C. or less and 1,350° C. or less, respectively, by lowering the viscosity of the glass during manufacture.

It is preferable that the value $Al_2O_3/B_2O_3$ of the glass having the composition C be 6.0 or less, even preferably 4.0 or less, further preferably 3.0 or less, and particularly preferably 2.0 or less.

From the viewpoints of improving the acid resistance and the alkali resistance, it is preferable that the value $Al_2O_3/B_2O_3$ of the glass having the composition C be 0.10 or more, even preferably 0.50 or more, further preferably 0.80 or more, even further preferably 1.0 or more, particularly preferably 1.3 or more, and most preferably 1.4 or more.

The glass having the composition C may include a very small amount of $R_2O$ from the viewpoint of lowering the temperatures $T_2$ and $T_4$ at the time of manufacture or to facilitate heating of a glass melt by direct conduction of electricity through it. Furthermore, where the glass having the composition C includes $R_2O$, the viscosity of the glass is lowered and the ease of shaping into a windshield is thereby increased. To obtain these advantages, it is preferable that the $R_2O$ content of the glass having the composition C be 0.0010% or more, even preferably 0.0050% or more, further preferably 0.0070% or more, even further preferably 0.010% or more, particularly preferably 0.020% or more, and most preferably 0.030% or more.

On the other hand, in the glass having the composition C, the millimeter wave transparency possibly lowers if the $R_2O$ content becomes too high. Thus, the $R_2O$ content may be 5.0% or less, preferably 2.0% or less, even preferably 1.5% or less, further preferably 1.0% or less, even further preferably 0.50% or less, particularly preferably 0.20% or less, and most preferably 0.10% or less.

Furthermore, $Li_2O$, $Na_2O$, and $K_2O$ are components for increasing the meltability of glass. The glass having the composition C may contain one, two, or all of them at 0.0010% or more each. It is preferable that the $Na_2O$ content of the glass having the composition C be 0% or more and 5.0% or less.

It is even preferable that the $Na_2O$ content of the glass having the composition C be 0.0050% or more, further preferably 0.010% or more, particularly preferably 0.020% or more, and most preferably 0.030% or more.

On the other hand, if the $Na_2O$ content of the glass having the composition C is too high, the radio wave (millimeter wave) transmittance may be low. It is even preferable that the $Na_2O$ content of the glass having the composition C be 3.0% or less, further preferably 2.0% or less, even further preferably 1.0% or less, particularly preferably 0.50% or less, and most preferably 0.20% or less.

It is preferable that the $K_2O$ content of the glass having the composition C be 0.0050% or more, even preferably 0.010% or more, further preferably 0.020% or more, and particularly preferably 0.030% or more.

On the other hand, if the $K_2O$ content of the glass having the composition C is too high, the radio wave (millimeter wave) transmittance may be low. It is preferable that the $K_2O$ content of the glass having the composition C be 3.0% or less, even preferably 2.0% or less, further preferably 1.0% or less, particularly preferably 0.50% or less, and most preferably 0.20% or less.

The glass having the composition C even preferably contains both of $Na_2O$ and $K_2O$ because the weatherability can be improved while necessary meltability is maintained and, furthermore, the effect of increasing the radio wave (millimeter wave) transmittance is expected. Where the contents of $Na_2O$ and/or $K_2O$ of the glass having the composition C are set in the above prescribed ranges, the glass having the composition C can be used as a window material that well matches other members. Furthermore, where the contents of $Na_2O$ and/or $K_2O$ of the glass having the composition C are set in the above ranges, high radio wave (millimeter wave) transmittance can be obtained.

It is preferable that the $Li_2O$ content of the glass having the composition C be 0% or more and 5.0% or less. $Li_2O$ is a component for increasing the meltability of glass as well as a component for making it easier to increase the Young's modulus to thereby contribute to increasing the strength of glass. Furthermore, the effect of increasing the radio wave (millimeter wave) transmittance is expected.

Where the glass having the composition C contains $Li_2O$, it is preferable that its content be 0.0010% or more, even preferably 0.0020% or more and further preferably 0.0030% or more.

On the other hand, if the $Li_2O$ content of the glass having the composition C is too high, devitrification or phase separation may occur during glass manufacture to make it difficult to continue the manufacture. Thus, it is preferable that the $Li_2O$ content of the glass having the composition C be 3.0% or less, even preferably 2.0% or less, further preferably 1.0% or less, particularly preferably 0.50% or less, and most preferably 0.20% or less.

Incidentally, where the glass having the composition C contains an alkali(s), $Na_2O/R_2O$ of the glass having the composition C may be set at 0 or more and 0.90 or less to increase the weatherability and the radio wave (millimeter wave) transmittance. The effects of increasing the weatherability and the radio wave (millimeter wave) transmittance may not be obtained sufficiently if $Na_2O/R_2O$ is either too low or too high.

Where the glass having the composition C contains $Li_2O$, it is preferable that the lower limit of $Na_2O/R_2O$ of the glass having the composition C be 0.010 or more, even preferably 0.10 or more, further preferably 0.20 or more, and particularly preferably 0.30 or more.

Where the glass having the composition C does not contain $Li_2O$, it is better that the lower limit of $Na_2O/R_2O$ be somewhat more than in a case that it contains $Li_2O$. It is preferable that the lower limit of $Na_2O/R_2O$ be 0.010 or more, even preferably 0.20 or more, and further preferably 0.40 or more.

Where the glass having the composition C contains an alkali(s), it is preferable that where $Li_2O$ is contained the upper limit of $Na_2O/R_2O$ of the glass having the composition C be 0.80 or less, even preferably 0.60 or less, and further preferably 0.40 or less.

Furthermore, where the glass having the composition C does not contain $Li_2O$, it is better that the upper limit of $Na_2O/R_2O$ be somewhat more than in a case that it contains $Li_2O$. It is preferable that the upper limit of $Na_2O/R_2O$ be 0.90 or less, even preferably 0.70 or less and further preferably 0.55 or less.

Where the glass having the composition C contains an alkali(s), to increase the weatherability and the radio wave (millimeter wave) transmittance, it is preferable that $K_2O/R_2O$ of the glass having the composition C may be 0 or more an 0.70 or less. The effect of increasing the radio wave (millimeter wave) transmittance may not be obtained sufficiently if $K_2O/R_2O$ is either too low or too high.

Where the glass having the composition C contains $Li_2O$, it is preferable that the lower limit of $K_2O/R_2O$ of the glass having the composition C be 0.010 or more, even preferably 0.10 or more, further preferably 0.20 or more, and particularly preferably 0.30 or more.

Where the glass having the composition C does not contain $Li_2O$, it is better that the lower limit of $K_2O/R_2O$ be somewhat more than in a case that it contains $Li_2O$. It is preferable that the lower limit of $K_2O/R_2O$ be 0.010 or more, even preferably 0.20 or more and further preferably 0.40 or more.

Where the glass having the composition C contains $Li_2O$, it is preferable that the upper limit of $K_2O/R_2O$ of the glass having the composition C be 0.70 or less, even preferably 0.60 or less and further preferably 0.40 or less.

Where the glass having the composition C does not contain $Li_2O$, it is better that the upper limit of $K_2O/R_2O$ be somewhat more than in a case that it contains $Li_2O$. It is preferable that the upper limit of $K_2O/R_2O$ be 0.70 or less and even preferably 0.60 or less.

Where the glass having the composition C contains an alkali(s), to increase the weatherability and the radio wave (millimeter wave) transmittance, $Li_2O/R_2O$ of the glass having the composition C may be 0 or more and 1.0 or less. Since $Li_2O$ is more in the effect of increasing the radio wave (millimeter wave) transmittance than $Na_2O$ and $K_2O$, $Li_2O/R_2O$ being more is preferable.

Where the glass having the composition C contains $Na_2O$ and/or $K_2O$, it is preferable that the lower limit of $Li_2O/R_2O$ of the glass having the composition C be 0.010 or more, even preferably 0.10 or more, further preferably 0.20 or more, and particularly 0.30 or more.

From the viewpoints of improving the weatherability and suppressing the phase separation, it is preferable that the upper limit of $Li_2O/R_2O$ of the glass having the composition C be 1.0 or less, even preferably 0.90 or less, and further preferably 0.80 or less.

Furthermore, to improve the weatherability and suppress devitrification and phase separation during manufacture of a glass plate, the glass having the composition C may include RO representing the sum of the contents of MgO, CaO, SrO, and BaO.

It is preferable that the RO content of the glass having the composition C be 1.0% or more, even preferably 5.0% or more, further preferably 7.0% or more, even further preferably 9.0% or more, particularly preferably 11% or more, and most preferably 13% or more.

On the other hand, in the glass having the composition C, devitrification may be prone to occur if the RO content is too high. Furthermore, the radio wave (millimeter wave) transparency may lower as the relative permittivity and the dielectric tangent increase. Thus, the RO content may be 25% or less. It is preferable that the RO content of the glass having the composition C be 22% or less, even preferably 20% or less, further preferably 19% or less, particularly preferably 18% or less, and most preferably 17% or less.

The MgO content of the glass having the composition C may be 0% or more and 20% or less. MgO is a component for accelerating the melting of glass materials and improving the weatherability and the Young's modulus.

It is preferable that the MgO content of the glass having the composition C be 0.10% or more, even preferably 1.0% or more, further preferably 2.0% or more, particularly preferably 3.0% or more, and most preferably 4.0% or more.

Devitrification is less prone to occur in the case where the MgO content of the glass having the composition C is 20% or less. If the MgO content of the glass having the composition C is too high, the radio wave (millimeter wave) transmittance may decrease as the relative permittivity and the dielectric tangent increase. Thus, it is preferable that the MgO content be 15% or less, even preferably 10% or less, further preferably 8.0% or less, particularly preferably 7.0% or less, and most preferably 6.0% or less.

It is preferable that the CaO content of the glass having the composition C be 0% or more and 20% or less. CaO is a component that accelerates the melting of glass materials and contributes to suppressing the devitrification.

It is preferable that the CaO content of the glass having the composition C be 0.10% or more, even preferably 1.0% or more, further preferably 2.0% or more, particularly preferably 3.0% or more, and most preferably 4.0% or more.

Devitrification is less prone to occur in the case where the CaO content of the glass having the composition C is 20% or less. If the CaO content of the glass having the composition C is too high, the radio wave (millimeter wave) transmittance may decrease as the relative permittivity and the dielectric tangent increase. Thus, it is preferable that the CaO content be 15% or less, even preferably 10% or less, further preferably 8.0% or less, particularly preferably 7.0% or less, and most preferably 6.0% or less.

It is preferable that the SrO content of the glass having the composition C be 0% or more and 20% or less. SrO is a component that accelerates the melting of glass materials and contributes to suppressing the devitrification.

It is preferable that the SrO content of the glass having the composition C be 0.10% or more, even preferably 1.0% or more, further preferably 2.0% or more, particularly preferably 3.0% or more, and most preferably 4.0% or more.

The glass having the composition C is less prone to devitrify in the case where its SrO content is 20% or less. On the other hand, if the SrO content of the glass having the composition C is too high, the Young' modulus may become small or the radio wave (millimeter wave) transmittance may decrease as the relative permittivity and the dielectric tangent increase. Thus, it is preferable that the SrO content be 15% or less, even preferably 10% or less, further preferably 8.0% or less, particularly preferably 7.0% or less, and most preferably 6.0% or less.

It is preferable that the BaO content of the glass having the composition C be 0% or more and 10% or less. BaO is a material that accelerates the melting of glass materials and contributes to suppressing devitrification.

It is preferable that the BaO content of the glass having the composition C be 0.010% or more, even preferably 0.020% or more, further preferably 0.030% or more, and particularly preferably 0.040% or more.

Where the BaO content of the glass having the composition C is 10% or less, devitrification is less prone to occur and the weatherability can be kept. On the other hand, if the BaO content of the glass having the composition C is too high, the Young's modulus may become small and the radio wave (millimeter wave) transmittance may decrease as the relative permittivity and the dielectric tangent increase. Thus, it is preferable that the BaO content be 8.0% or less, even preferably 5.0% or less, further preferably 3.0% or less, even further preferably 1.0% or less, particularly preferably 0.50% or less, and most preferably 0.10% or less.

The $Fe_2O_3$ content of the glass having the composition C may be 0.0010% or more and 1.0% or less. If the $Fe_2O_3$ content of the glass having the composition C is less than 0.0010%, the glass having the composition C may not be able to be used for uses that require heat insulation. Furthermore, it may become necessary to use expensive materials that are low in iron content to manufacture a glass plate. Still further, if the $Fe_2O_3$ content of the glass having the composition C is less than 0.0010%, an unnecessarily large amount of heat radiation may reach the bottom surface of a melting furnace to impose a considerable load on the melting furnace.

It is preferable that the $Fe_2O_3$ content of the glass having the composition C be 0.0030% or more, even preferably 0.010% or more, further preferably 0.050% or more, and particularly preferably 0.10% or more.

On the other hand, if the $Fe_2O_3$ content of the glass having the composition C is more than 1%, heat transfer by radiation is obstructed during manufacture to possibly make it difficult to melt materials. Furthermore, if the $Fe_2O_3$ content of the glass having the composition C is too high, the transmittance of visible light decreases and hence it may become not suitable for a vehicular window glass.

It is preferable that the $Fe_2O_3$ content of the glass having the composition C be 0.50% or less, even preferably 0.30% or less and further preferably 0.20% or less.

Furthermore, the glass having the composition C may contain $TiO_2$. Where the glass having the composition C contains $TiO_2$, it is preferable that its content be 0.0010% or more and 5.0% or less.

For example, if the glass having the composition C does not contain $TiO_2$, a foam layer may be formed at the surface of molten glass during manufacture of a glass plate, in which case the temperature of the molten glass is not increased to an intended temperature and hence it becomes difficult to conduct fining, resulting in reduction in productivity. To make the foam layer formed at the surface of molten glass thin or disappear, it is possible to supply, as a defoaming agent, a titanium compound to the foam layer formed at the surface of the molten glass. The titanium compound is taken into the molten glass and comes to exist as $TiO_2$.

It is preferable that the $TiO_2$ content of the glass having the composition C be 0.0050% or more. Since $TiO_2$ exhibits absorption of ultraviolet light, it is preferable to add $TiO_2$ if it is desired to cut ultraviolet light. In this case, it is preferable that the $TiO_2$ content be 0.050% or more, even preferably 0.10% or more.

On the other hand, if the $TiO_2$ content is too high, the liquidus temperature increases, possibly causing devitrification. Furthermore, visible light is absorbed to possibly cause yellow coloration. In view of these, it is preferable that the $TiO_2$ content of the glass having the composition C be 5.0% or less, even preferably 0.50% or less, further preferably 0.20% or less, and particularly preferably 0.10% or less.

Furthermore, the tan δ of the glass having the composition C is made small by adjusting its composition, as a result of which the dielectric loss can be reduced and a high radio wave (millimeter wave) transmittance can be attained. Likewise, the relative permittivity can be adjusted by adjusting its composition, whereby the degree of reflection of radio waves at the interface with the intermediate film can be suppressed and a high radio wave (millimeter wave) transmittance can thereby be attained.

Still further, it is preferable that the relative permittivity at 10 GHz of the glass having the composition C be 6.50 or lower. Where the relative permittivity at 10 GHz is 6.50 or lower, the relative permittivity difference from the intermediate film is made small, whereby the degree of reflection of radio waves (millimeter waves) at the interface with the intermediate film can be suppressed.

It is even preferable that the relative permittivity at 10 GHz of the glass having the composition C be 6.00 or lower, further preferably 5.75 or lower and particularly preferably 5.50 or lower.

Although there are no particular limitations on the lower limit of the relative permittivity at 10 GHz of the glass having the composition C, the relative permittivity at 10 GHz may be 4.50 or higher, for example.

It is preferable that the dielectric tangent at 10 GHz of the glass having the composition C be 0.0080 or lower. Where the dielectric tangent at 10 GHz is 0.0080 or lower, the radio wave (millimeter wave) transmittance can be increased.

It is preferable that the dielectric tangent at 10 GHz of the glass having the composition C be 0.0075 or lower, even preferably 0.0070 or lower, further preferably 0.0065 or lower, particularly preferably 0.0060 or lower, and most preferably 0.0055 or lower.

Although there are no particular limitations on the dielectric tangent at 10 GHz of the glass having the composition C, the dielectric tangent at 10 GHz may be 0.0020 or higher, for example.

Where the relative permittivity and the dielectric tangent at 10 GHz of the glass having the composition C are in the above ranges, a high radio wave (millimeter wave) transmittance can be attained also in a range of 10 to 90 GHz.

The relative permittivity and a dielectric tangent at 10 GHz of glass having the composition C can be measured by the above-mentioned method.

If water exists in the glass having the composition C, the glass having the composition absorbs near infrared light. As a result, the transmittance of near infrared light decreases, as a result of which a trouble may occur not only in transmission and reception of radio waves (millimeter waves) but also when an infrared light emitting device (e.g., laser radar) is used.

In this connection, in general, water in glass can be represented by a β-OH value. It is preferable that the β-OH value of the glass having the composition C be 0.70 $mm^{-1}$ or smaller, even preferably 0.60 mm$^{-1}$ or smaller, further preferably 0.50 mm$^{-1}$ or smaller, and particularly preferably 0.40 mm$^{-1}$ or smaller. The β-OH value is obtained according to the following equation on the basis of a transmittance of glass measured using FT-IR (Fourier transform infrared spectrophotometer):

$$\beta\text{-OH} = (1/X)\log_{10}(T_A/T_B)(\text{mm}^{-1})$$

where

X: sample thickness (mm), $T_A$: transmittance (%) at a reference wave number 4,000 cm$^{-1}$, and $T_B$: minimum transmittance (%) around a hydroxyl group absorption wave number 3,600 cm$^{-1}$.

If the glass having the composition C contains water as mentioned above, the glass having the composition C absorbs near infrared light. Thus, to increase the heat insulation, it is preferable that the β-OH value of the glass having the composition C be 0.050 mm$^{-1}$ or larger, even preferably 0.10 mm$^{-1}$ or larger, further preferably 0.15 mm$^{-1}$ or larger, and particularly preferably 0.20 mm$^{-1}$ or larger.

It is preferable that the specific gravity of the glass having the composition C be 2.1 or larger and 2.8 or smaller. It is preferable that the Young's modulus of the glass having the composition C be 50 GPa or larger and 90 GPa or smaller. And it is preferable that the average linear expansion coefficient from 50° C. to 350° C. of the glass having the composition C be 30×10$^{-7}$/K or larger and 60×10$^{-7}$/K or smaller. Where the glass having the composition C satisfies these conditions, it can be used suitably as a vehicular laminated glass.

To secure necessary weatherability, it is preferable that the glass having the composition C contain SiO$_2$ at a certain content, as a result of which the specific gravity of the glass having the composition C can be 2.1 or larger. It is preferable that the specific gravity of the glass having the composition C be 2.2 or larger. Where the specific gravity of the glass having the composition C is 2.8 or smaller, it is not prone to become brittle and can be reduced in weight. It is preferable that the specific gravity of the glass having the composition C be 2.7 or smaller, even preferably 2.6 or smaller.

Where the Young's modulus of the glass having the composition C is large, it becomes high in stiffness and comes to be more suitable for a vehicular window glass etc. It is preferable that the Young's modulus of the glass having the composition C be 55 GPa or larger, even preferably 60 GPa or larger, further preferably 65 GPa or larger, particularly preferably 68 GPa or larger, and most preferably 70 GPa or larger.

On the other hand, to suppress thermal cracking of a glass plate, it is better that the Young's modulus be small. It is preferable that the Young's modulus of the glass having the composition C be 85 GPa or smaller, even preferably 82 GPa or smaller, further preferably 80 GPa or smaller, particularly preferably 78 GPa or smaller, and most preferably 77 GPa or smaller.

Furthermore, it is preferable that the glass having the composition C be small in average linear expansion coefficient because in that case generation of thermal stress resulting from a temperature distribution of a glass plate is suppressed and the glass plate is thereby made less prone to suffer thermal cracking.

It is preferable that the average linear expansion coefficient from 50° C. to 350° C. of the glass having the composition C be 20×10$^{-7}$/K or larger, even preferably 30×10$^{-7}$/K or larger, and further preferably 35×10$^{-7}$/K or larger.

On the other hand, if the average linear expansion coefficient is too large, generation of thermal stress resulting from a temperature distribution of a glass plate is prone to be caused and thermal cracking of the glass plate may occur in a glass plate shaping step, a gradual cooling step, or a windshield shaping step. In addition, the expansion difference between the glass plate and a support member or the like may become so large as to cause distortion, possibly resulting in cracking of the glass plate.

It is preferable that the average linear expansion coefficient from 50° C. to 350° C. of the glass having the composition C be 55×10$^{-7}$/K or smaller, even preferably 50×10$^{-7}$/K or smaller, further preferably 45×10$^{-7}$/K or smaller, even further preferably 43×10$^{-7}$/K or smaller, particularly preferably 41×10$^{-7}$/K or smaller, and most preferably 40×10$^{-7}$/K or smaller.

It is preferable that $T_2$ of the glass having the composition C be 1,750° C. or lower, $T_4$ of the glass having the composition C be 1,350° C. or lower, and $T_4$-$T_L$ of the glass having the composition C be −50° C. or higher.

If $T_2$ or $T_4$ of the glass having the composition C is higher than the above prescribed temperature, it becomes difficult to manufacture a large plate by a float method, a rollout method, a down draw method, or the like.

It is even preferable that $T_2$ of the glass having the composition C be 1,700° C. or lower, further preferably 1,670° C. or lower.

It is even preferable that $T_4$ be 1,300° C. or lower, further preferably 1,250° C. or lower.

Although there are no particular limitations on the lower limits of $T_2$ and $T_4$ of the glass having the composition C, to maintain necessary weatherability and glass specific gravity, $T_2$ and $T_4$ should typically be 1,500° C. or higher and 1,100° C. or higher, respectively.

It is preferable that $T_2$ of the glass having the composition C be 1,550° C. or higher, even preferably 1,600° C. or higher. It is preferable that $T_4$ of the glass having the composition C be 1,150° C. or higher, even preferably 1,200° C. or higher.

Furthermore, to enable manufacture by a float method, it is preferable that $T_4$-$T_L$ of the glass having the composition C be −50° C. or higher. If this difference is lower than −50° C., devitrification occurs in the glass during glass shaping to cause such problems as lowering of the mechanical properties of the glass and reduction of its transparency, which may make it difficult to obtain high-quality glass.

It is even preferable that $T_4$-$T_L$ of the glass having the composition C be 0° C. or higher, further preferably +20° C. or higher.

Furthermore, it is preferable that $T_g$ of the glass having the composition C be 550° C. or higher and 750° C. or lower. Where $T_g$ is in this prescribed temperature range, glass bend working can be performed in ordinary manufacturing condition ranges. If $T_g$ of the glass having the composition C is lower than 550° C., whereas there are no problems in shaping performance, such problems as reduction in weatherability are prone to occur. Furthermore, if $T_g$ of the glass having the composition C is lower than 550° C., devitrification may occur in a shaping temperature range to disable shaping.

It is even preferable that $T_g$ of the glass having the composition C be 600° C. or higher, further preferably 620° C. or higher and particularly preferably 630° C. or higher.

On the other hand, if $T_g$ is too high, a high temperature is required at the time of glass bend working to make it difficult to perform manufacture. It is even preferable that $T_g$ of the glass having the composition C be 740° C. or lower, further preferably 730° C. or lower and particularly preferably 720° C. or lower.

It is preferable that the content of NiO of each of the first glass plate 11 and the second glass plate 12 employed in the embodiment be 0.01% or less irrespective of whether it is in the form of any of the glass having the composition A, the glass having the composition B, and the glass having the composition C.

The glass plate according to the embodiment may contain components (hereinafter also referred to as "other components") other than $SiO_2$, $Al_2O_3$, $B_2O_3$, $R_2O$, RO, $TiO_2$, and $Fe_2O_3$. Where such components are contained, it is preferable that their total content be 5.0% or less.

Examples of the other components include $ZrO_2$, $Y_2O_3$, $Nd_2O_5$, $P_2O_5$, $GaO_2$, $GeO_2$, $CeO_2$, $MnO_2$, CoO, $Cr_2O_3$, $V_2O_5$, Se, $Au_2O_3$, $Ag_2O$, CuO, CdO, $SO_3$, Cl, F, $SnO_2$, and $Sb_2O_3$. And they may in the form of metal ions or oxides.

It is preferable that in the glass plate according to the embodiment the content of NiO be 0.010% or less, and the total content of the other components be 5.0% or less, even preferably 3.0% or less, particularly preferably 2.0% or less, and most preferably 1.0% or less.

If the first glass plate 11 and the second glass plate 12 employed in the embodiment contain NiO, the glass destruction may occur due to generation of NiS. Thus, it is preferable that the content of NiO be 0.010% or less. It is even preferable that the NiO content of the glass plate according to the embodiment be 0.0050% or less, and it is further preferable that the first glass plate 11 and the second glass plate 12 contain substantially no NiO.

The other components can be contained at 5.0% or less for various purposes (e.g., fining and coloring). If the content of the other components is more than 5.0%, the radio wave (millimeter wave) transmittance may lower. It is preferable that the content of the other components be 2.0% or less, even preferably 1.0% or less, further preferably 0.50% or less, particularly preferably 0.30% or less, and most preferably 0.10% or less.

Furthermore, to prevent influences on the environment, it is preferable that the content of each of $As_2O_3$ and PbO be less than 0.0010%.

$CeO_2$ makes it possible to control the content of FeO by functioning as an oxidizing agent as well as to interrupt ultraviolet light. Where each of the first glass plate 11 and the second glass plate 12 employed in the embodiment contains $CeO_2$, it is preferable that its content be 0.0040% or more, even preferably 0.010% or more, further preferably 0.050% or more, and particularly preferably 0.10% or more.

On the other hand, to increase the productivity, it is preferable that the $CeO_2$ content of the glass plate according to the embodiment be 1.0% or less, further preferably 0.50% or less and even further 0.30% or less.

$Cr_2O_3$ can control the content of FeO by functioning as an oxidizing agent. Where the first glass plate 11 and the second glass plate 12 employed in the embodiment contain $Cr_2O_3$, it is preferable that its content be 0.0020% or more, even preferably 0.0040% or more.

On the other hand, $Cr_2O_3$ causes coloration for visible light and hence may lower the visible light transmittance. Where the glass plate according to the embodiment contains $Cr_2O_3$, it is preferable that its content be 1.0% or less, even preferably 0.50% or less, further preferably 0.30% or less, and particularly preferably 0.10% or less.

$SnO_2$ can control the content of FeO by functioning as a reducing agent. Where the first glass plate 11 and the second glass plate 12 employed in the embodiment contain $SnO_2$, it is preferable that its content be 0.010% or more, even preferably 0.040% or more, further preferably 0.060% or more, and particularly preferably 0.080% or more.

On the other hand, to suppress occurrence of defects originating from $SnO_2$ during manufacture of a glass plate, it is preferable that the $SnO_2$ content of the first glass plate 11 and the second glass plate 12 employed in the embodiment be 1.0% or less, even preferably 0.50% or less, further preferably 0.30% or less, and particularly preferably 0.20% or less.

Furthermore, $P_2O_5$ is prone to cause glass defects in a float bath when each of the first glass plate 11 and the second glass plate 12 employed in the embodiment is manufactured by a float method. Thus, it is preferable that the $P_2O_5$ content of the first glass plate 11 and the second glass plate 12 employed in the embodiment be 1.0% or less, even preferably 0.10% or less, further preferably 0.050% or less, and particularly preferably less than 0.010%.

Still further, in the vehicular laminated glass 10 according to the embodiment, where both of the first glass plate 11 and the second glass plate 12 are a borosilicate glass, it is preferable that at least one of the first glass plate 11 and the second glass plate 12 is the borosilicate glass having the above-mentioned composition A, B, or C.

It is even preferable that at least the first glass plate 11 be the borosilicate glass having the above-mentioned composition A, B, or C.

It is further preferable that both of the first glass plate 11 and the second glass plate 12 be the borosilicate glass having the above-mentioned composition A, B, or C.

Where the second glass plate 12 is not the borosilicate glass, there are no particular limitations on the type of this glass plate; a known glass plate to be used as a vehicular window glass can be used. Specific examples include an alkali aluminosilicate glass and a soda-lime glass. These glass plates may be colored to such a degree as not render the transparency unacceptably low.

In the embodiment of the invention, the first glass plate 11 may be the borosilicate glass as mentioned above and the second glass plate 12 may be the alkali aluminosilicate glass that contains $Al_2O_3$ at 1.0% or more in mole percentage in terms of oxides. Where the second glass plate 12 is the alkali aluminosilicate glass, it can be strengthened chemically (described later) and can thereby be increased in strength. The alkali aluminosilicate glass is also advantageous in that it can be chemically strengthened more easily than the borosilicate glass can.

From the viewpoints of weatherability and chemical strengthening, it is even preferable that the above-mentioned alkali aluminosilicate glass contain $Al_2O_3$ at 2.0% or more in mole percentage in terms of oxides, further preferably 2.5% or more.

Furthermore, in the alkali aluminosilicate glass, the radio wave (millimeter wave) transmittance may decrease when the $Al_2O_3$ content is high. Thus, it is preferable that the $Al_2O_3$ content be 20% or less, even preferably 15% or less.

From the viewpoint of chemical strengthening, it is preferable that the $R_2O$ content of the above-mentioned alkali aluminosilicate glass be 10% or more in mole percentage in terms of oxides, even preferably 12% or more and further preferably 13% or more.

Still further, in the alkali aluminosilicate glass, the radio wave (millimeter wave) transmittance may decrease when the $R_2O$ content is high. Thus, it is preferable that the $R_2O$ content be 25% or less, even preferably 20% or less, and further preferably 19% or less.

A specific example of the above-mentioned alkali aluminosilicate glass includes a glass having the following composition. The content of each component is represented in mole percentage in terms of oxides.
<Composition D>
  $61\% \leq SiO_2 \leq 77\%$,
  $1.0\% \leq Al_2O_3 \leq 20\%$,
  $0\% \leq B_2O_3 \leq 10\%$,
  $0\% \leq MgO \leq 15\%$,
  $0\% \leq CaO \leq 10\%$,
  $0\% \leq SrO \leq 1.0\%$,
  $0\% \leq BaO \leq 1.0\%$,
  $0\% \leq Li_2O \leq 15\%$,
  $2.0\% \leq Na_2O \leq 15\%$,
  $0\% \leq K_2O \leq 6.0\%$,
  $0\% \leq ZrO_2 \leq 4.0\%$,
  $0\% \leq TiO_2 \leq 1.0\%$,
  $0\% \leq Y_2O_3 \leq 2.0\%$,
  $10\% \leq R_2O \leq 25\%$, and
  $0\% \leq RO \leq 20\%$,
  $0\% \leq TiO_2 \leq 1.0\%$,
  $0\% \leq Y_2O_3 \leq 2.0\%$,
  $10\% \leq R_2O \leq 25\%$, and
  $0\% \leq RO \leq 20\%$,
where $R_2O$ represents the total content of $Li_2O$, $Na_2O$, and $K_2O$ and RO represents the total content of MgO, CaO, SrO and BaO.

The soda-lime glass may be a soda-lime glass that contains $Al_2O_3$ at less than 1.0% in mole percentage in terms of oxides. A specific example includes a glass having the following composition. The content of each component is represented in mole percentage in terms of oxides.
<Composition E>
  $60\% \leq SiO_2 \leq 75\%$,
  $0\% \leq Al_2O_3 \leq 1.0\%$,
  $2.0\% \leq MgO \leq 11\%$,
  $2.0\% \leq CaO \leq 10\%$,
  $0\% \leq SrO \leq 3.0\%$,
  $0\% \leq BaO \leq 3.0\%$,
  $10\% \leq Na_2O \leq 18\%$,
  $0\% \leq K_2O \leq 8.0\%$,
  $0\% \leq ZrO_2 \leq 4.0\%$, and
  $0.0010\% \leq Fe_2O_3 \leq 5.0\%$.

It is preferable that the thickness of the first glass plate 11 be 2.50 mm or larger. Where the thickness of the first glass plate 11 is 2.50 mm or larger, the strength against flying stones of the laminated glass 10 can be increased while the radio wave (millimeter wave) transparency is kept high.

It is preferable that the thickness of the first glass plate 11 be 2.60 mm or larger, even preferably 2.70 mm or larger, further preferably 2.80 mm or larger, even further preferably 2.90 mm or larger, particularly preferably 3.00 mm or larger, and most preferably 3.10 mm or larger.

It is preferable that the upper limit of the thickness of the first glass plate 11 be 10.0 mm or smaller, even preferably 8.00 mm or smaller, further preferably 6.00 mm or smaller, even further preferably 5.00 mm or smaller, even still further preferably 4.00 mm or smaller, particularly preferably 3.80 mm or smaller, and most preferably 3.50 mm or smaller. The thickness of the first glass plate 11 being 10.0 mm or smaller is preferable from the viewpoint of increasing the fuel efficiency of a vehicle because the mass of the laminated glass 10 does not become too large.

It is preferable that the thickness of the second glass plate 12 be 1.50 mm or smaller. The thickness of the second glass plate 12 being 1.50 mm or smaller is preferable because the radio wave (millimeter wave) transparency can be kept high and the mass of the laminated glass 10 does not become too large which is preferable in terms of fuel efficiency.

It is preferable that the thickness of the second glass plate 12 be 1.30 mm or smaller, even preferably 1.20 mm or smaller, further preferably 1.10 mm or smaller, even further preferably 1.00 mm or smaller, particularly preferably 0.900 mm or smaller, and most preferably 0.800 mm or smaller.

On the other hand, it is preferable that the lower limit of the thickness of the second glass plate 12 be 0.100 mm or larger, even preferably 0.300 mm or larger and further preferably 0.500 mm or larger. Where the thickness of the second glass plate 12 is 0.100 mm or larger, cracking can be prevented when an object collides with the laminated glass 10 from the inside of a vehicle.

The first glass plate 11 and the second glass plate 12 may be either the same or different from each other in thickness. In particular, it is preferable that the first glass plate 11 be thicker than the second glass plate 12. In this case, in the laminated glass 10, the first glass plate 11 which is disposed so as to face the outside of a vehicle is made higher in strength, whereby the resistance to scattered pieces such as flying stones occurring during running can be made high.

Furthermore, the incident angle dependence of the radio wave (millimeter wave) transparency is improved in the case where the first glass plate 11 and the second glass plate 12 are different from each other in thickness. That is, the radio wave (millimeter wave) transmittance of the laminated glass 10 can be kept at a high level irrespective of the incident angle of millimeter-wave radio waves on the first glass plate 11. It is inferred that this is because in the laminated glass 10, the first glass plate 11 and the second glass plate 12 are different from each other in thickness, whereby the phase of radio waves changes at the interfaces between the intermediate film and the glass and the reflection property is changed.

Where the first glass plate 11 and the second glass plate 12 are different from each other in thickness, it is preferable that the first glass plate 11 be thicker than the second glass plate 12 by 1.00 mm or more, even preferably by 1.50 mm or more, further preferably by 2.00 mm or more, and particularly preferably by 2.30 mm or more. Where the thickness difference is in these ranges, the incident angle dependence of the radio wave (millimeter wave) transparency is made better.

Furthermore, where the first glass plate 11 and the second glass plate 12 are different from each other in thickness, it is preferable that the first glass plate 11 be thicker than the second glass plate 12 by 9.50 mm or less, even preferably by 9.00 mm or less, further preferably by 7.00 mm or less, even further preferably by 5.00 mm or less, particularly preferably by 4.00 mm or less, and most preferably by 3.00 mm or less. In these cases, optical distortion originating from the glass quality of the configured laminated glass 10 can be suppressed.

It is noted that in the laminated glass 10 each of the first glass plate 11 and the second glass plate 12 may be constant in thickness over the entire surface. Alternatively, the thickness of one or both of the first glass plate 11 and the second glass plate 12 may vary from one part to another as necessary as exemplified by a case that it is shaped like a wedge in which the thickness varies.

It is preferable that each of the first glass plate 11 and the second glass plate 12 be a glass plate shaped by a known float method, for example. In the float method, a molten glass base material is caused to float on molten metal of tin or the like and then is shaped into a glass plate that is uniform in thickness and plate width by performing a strict temperature manipulation.

A glass plate may also be shaped by a known rollout method or down draw method and may be shaped into a glass plate whose surface is polished and that is uniform in thickness. The down draw method is generally classified into a slot down draw method and an overflow down draw method (fusion method) each of which is a technique of forming a band plate-shaped glass ribbon by causing molten glass to flow down continuously from a shaped body.

To increase the strength, the second glass plate 12 may be a chemically strengthened glass obtained by glass strengthening. Examples of a chemical strengthening treatment method includes an ion exchange method. In the ion exchange method, compressive stress is produced at the glass surface by immersing a glass plate in a treatment liquid (e.g., potassium nitrate molten salt) and thereby replacing ions having a small ion diameter (e.g., Na ions) that are contained in the glass with ions having a large ion diameter (e.g., K ions). The compressive stress is produced uniformly over the entire surface of the glass plate and a uniform-depth compressive stress layer is formed adjacent to the entire surface of the glass plate.

Each of the magnitude of the compressive stress at the surface of the glass plate (hereinafter referred to as "surface compressive stress CS") and the depth DOL of the compressive stress layer formed adjacent to the surface of the glass plate can be adjusted by the glass composition, the chemical strengthening treatment time, and the chemical strengthening treatment temperature. Examples of a chemically strengthened glass includes a glass obtained by performing chemical strengthening treatment on the alkali aluminosilicate glass as described above.

Each of the first glass plate 11 and the second glass plate 12 may have either a flat-plate shape or a curved shape in which the entire surface or a part of the surface has curvature.

Where each of the first glass plate 11 and the second glass plate 12 is curved, it may have either a singly bent structure in which it is curved in one of the top-bottom direction and the left-right direction or a doubly bent structure in which it is curved in both of the top-bottom direction and the left-right direction.

Where each of the first glass plate 11 and the second glass plate 12 has the doubly bent structure, the radius of curvature in the top-bottom direction and that in the left-right direction may either the same or different from each other.

Where each of the first glass plate 11 and the second glass plate 12 is curved, it is preferable that the radius of curvature in the top-bottom direction and/or that in the left-right direction be 1,000 mm or longer.

The shape of the major surfaces of the first glass plate 11 and the second glass plate 12 is made a shape that is suitable for a window opening of a vehicle in which they are installed.

[Intermediate Film]

The intermediate film 13 employed in the embodiment of the invention is sandwiched between the first glass plate 11 and the second glass plate 12. Since the vehicular laminated glass 10 according to the embodiment of the invention is provided with the intermediate film 13, the first glass plate 11 and the second glass plate 12 can be bonded to each other strongly and the impact of collision of a scattered piece with the glass plate can be reduced.

Various organic resins that are commonly employed in laminated glasses that are used conventionally as vehicular laminated glasses can be used as the intermediate film 13. For example, polyethylene (PE), an ethylene-vinyl acetate copolymer (EVA), polypropylene (PP), polystyrene (PS), methacrylic resin (PMA), polyvinyl chloride (PVC), polyethylene terephthalate (PET), polybutylene terephthalate (PBT), cellulose acetate (CA), diallyl phthalate resin (DAP), urea resin (UP), melamine resin (MF), unsaturated polyester (UP), polyvinyl butyral (PVB), polyvinyl formal (PVF), polyvinyl alcohol (PVAL), vinyl acetate resin (PVAc), ionomer (IO), polymethyl pentene (TPX), vinylidene chloride (PVDC), polysulfone (PSF), polyvinylidene fluoride (PVDF), methacryl-styrene copolymer resin (MS), polyallate (PAR), polyallyl sulfone (PASF), polybutadiene (BR), polyether sulfone (PESF), and polyether ether ketone (PEEK) are usable. Among these examples, EVA and PVB are suitable from the viewpoints of transparency and adhesiveness. In particular, PVB is preferable because it can impart a sound insulating property.

From the viewpoints of alleviation of impact and the sound insulating property, it is preferable that the thickness of the intermediate film 13 be 0.30 mm or larger, even preferably 0.50 mm or larger, and further preferably 0.70 mm or larger.

On the other hand, from the viewpoint of suppressing the reduction of visible light transmittance, it is preferable that the thickness of the intermediate film 13 be 1.0 mm or smaller, even preferably 0.90 mm or smaller, and further preferably 0.80 mm or smaller.

It is preferable that the thickness of the intermediate film 13 be in a range of 0.30 mm to 1.0 mm, even preferably in a range of 0.70 mm to 0.8 mm.

The thickness of the intermediate film 13 may be either constant over the entire surface or vary from one part to another as needed.

Incidentally, if a large difference exists between the linear expansion coefficient of the intermediate film 13 and that of each of the first glass plate 11 and the second glass plate 12, when the laminated glass 10 is produced by a process including a heating step (described later) the laminated glass 10 may crack or warp to cause an appearance failure. Thus, it is preferable that the difference between the linear expansion coefficient of the intermediate film 13 and that of each of the first glass plate 11 and the second glass plate 12 be as small as possible.

The difference between the linear expansion coefficient of the intermediate film 13 and that of each of the first glass plate 11 and the second glass plate 12 may be the difference between average linear expansion coefficients in a prescribed temperature range. In particular, since the resin of which the intermediate film 13 is made is low in glass transition temperature, a prescribed average linear expansion coefficient difference may be set in a temperature range that is lower than a glass transition temperature of the resin material.

Alternatively, a difference between the linear expansion coefficient of the resin material and that of each of the first glass plate 11 and the second glass plate 12 may be set at a prescribed temperature that is lower than a glass transition temperature of the resin material.

Furthermore, the intermediate film 13 may be an adhesive layer containing an adhesive. Although there are no particular limitations on the adhesive, an acrylic-based adhesive and a silicone-based adhesive, for example, may be used.

Where the intermediate film 13 is an adhesive layer, the probability of occurrence of the crack or the warp as mentioned above is low because a process of joining the first glass plate 11 and the second glass plate 12 need not include a heating step.

[Other Layers]

The laminated glass 10 according to the embodiment of the invention may have a layer(s) (hereinafter referred to as another layer or other layers) other than the first glass plate 11, the second glass plate 12, and the intermediate film 13 in such a range that the advantages of the invention are not impaired. For example, a coating layer that imparts a water repellent function, a hydrophilic function, an antifogging function, or the like or an infrared reflection film may be provided.

There are no particular limitations on the position where the other layer(s) is provided; it may be provided on the surface of the laminated glass 10 or may be sandwiched between the first glass plate 11 or the second glass plate 12 and the intermediate film 13.

For the purpose of hiding a portion to be attached to a frame body or the like, and a wiring conductor or the like, the laminated glass 10 according to the invention may have a black ceramic layer or the like that is formed on all or a part of a peripheral portion in a band-like manner.

The vehicular laminated glass 10 according to the embodiment of the invention can be manufactured in the same manner as a known laminated glass is. For example, the laminated glass 10 that is configured in such a manner that the first glass plate 11 and the second glass plate 12 are bonded to each other via the intermediate film 13 is obtained by a process including a step of laying the first glass plate 11, the intermediate film 13, and the second glass plate 12 one on another and then performing heating and pressing.

For example, the manufacturing method of a vehicular laminated glass 10 according to the embodiment of the invention may include a step of heating and shaping each of the first glass plate 11 and the second glass plate 12 and a subsequent step of inserting the intermediate film 13 between the first glass plate 11 and the second glass plate 12 and then performing heating and pressing. The laminated glass 10 that is configured in such manner that the first glass plate 11 and the second glass plate 12 are joined together via the intermediate film 13 may be produced by performing such a process.

An example case that the laminated glass 10 according to the embodiment is used as a window glass of a vehicle will be hereinafter described with reference to drawings.

Figure 3:
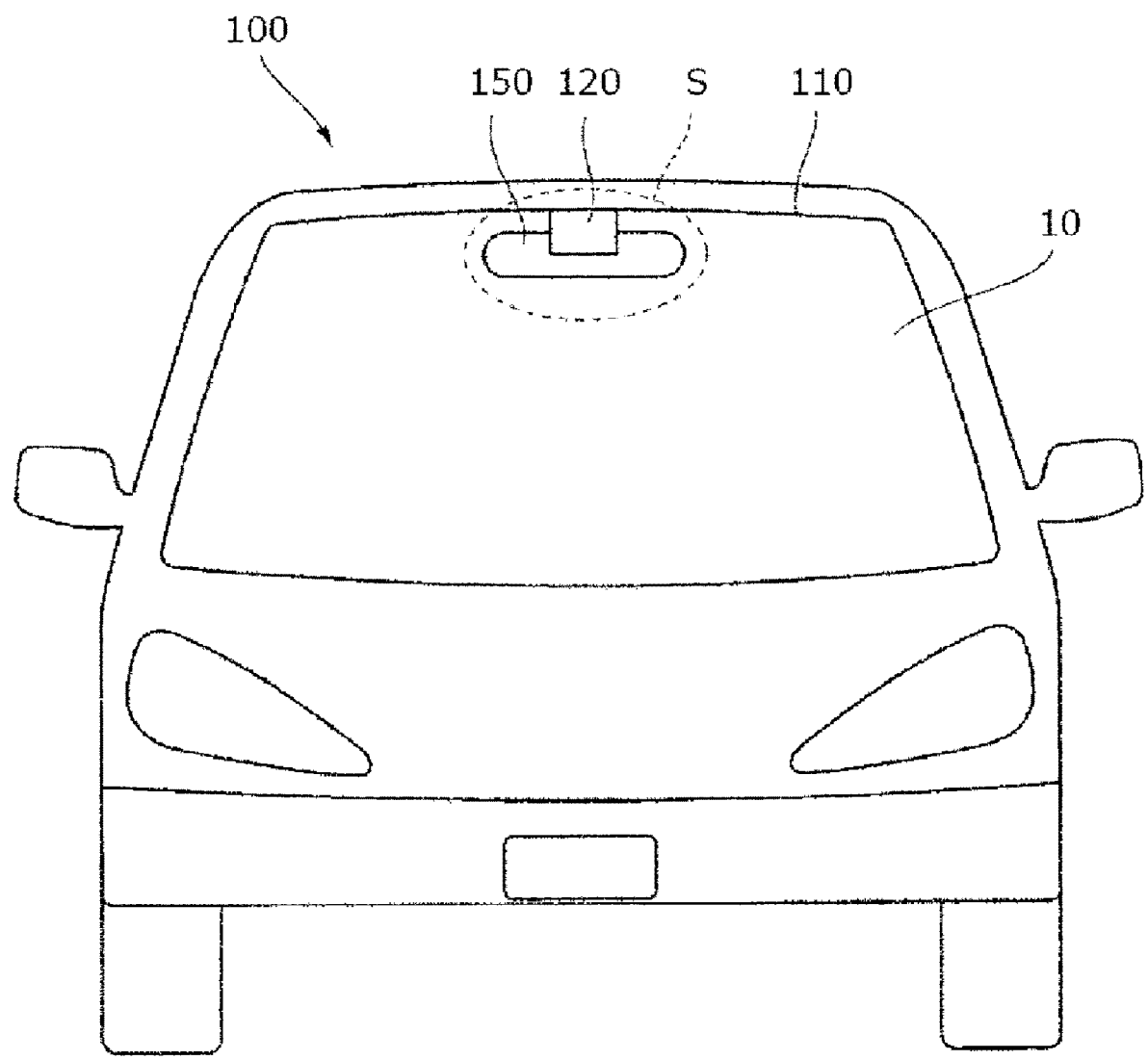
FIG. 3 is a conceptual diagram showing a state that a vehicular laminated glass according to the embodiment of the invention is used as a vehicular window glass.

FIG. 3 is a conceptual diagram showing a state that a vehicular laminated glass 10 according to the embodiment is attached to an opening 110, formed at a front position, of an automobile 100 and used as a vehicular window glass. A housing (case) 120 that houses an information device(s) etc. for securing running safety of the vehicle may be attached to the surface, located on the vehicle inside, of the laminated glass 10 that is used as a vehicular window glass.

The information device(s) housed in the housing is a device for preventing a collision (from behind) with a forward vehicle, a pedestrian, an obstacle, or the like existing ahead of or in front of the vehicle and notifying the driver of danger using a camera, a radar, or the like. For example, it is an information receiving device and/or an information transmitting device, or the like, includes a millimeter-wave radar, a stereo camera, an infrared laser, or the like, and transmits and receives a signal. This term "signal" means electromagnetic waves including millimeter waves, visible light, infrared light, etc.

Figure 4:
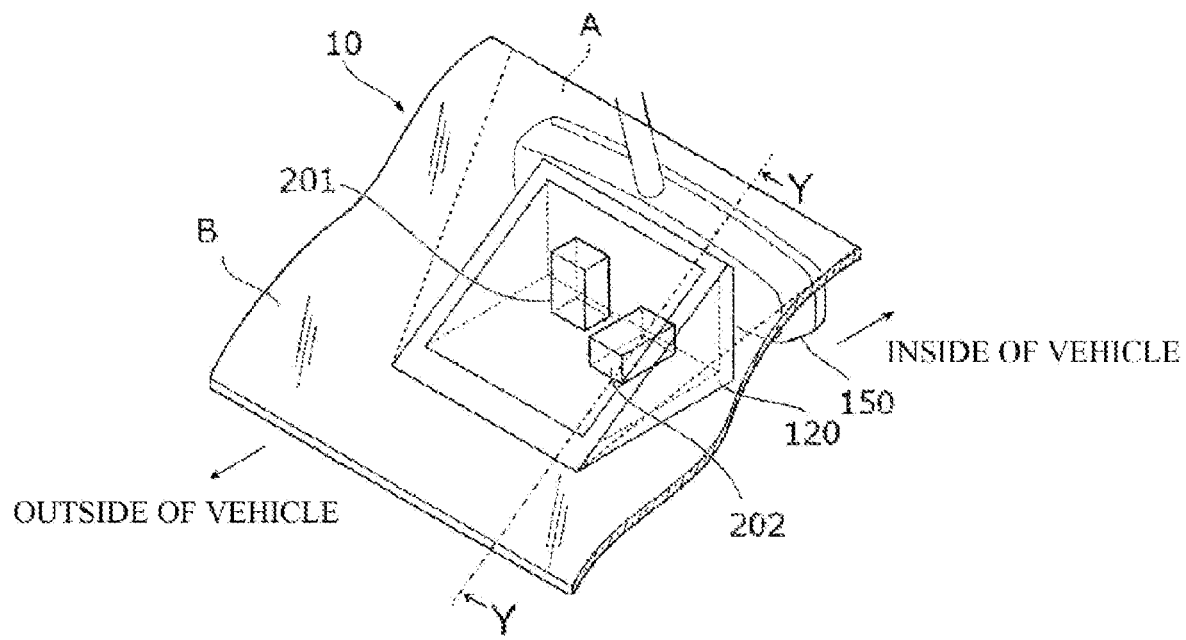
FIG. 4 is an enlarged view of the part S in FIG. 3.

FIG. 4 is an enlarged view of the part S in FIG. 3 and is a perspective view showing a portion in which the housing 120 is attached to the laminated glass 10 according to the embodiment. As information devices, a millimeter radar 201 and a stereo camera 202 are housed in the housing 120. The housing 120 which houses the information devices is usually attached to the outer side than a rearview mirror 150 and the inner side than the laminated glass 10 in the vehicle. Alternatively, the housing 120 may be attached to another portion.

Figure 5:
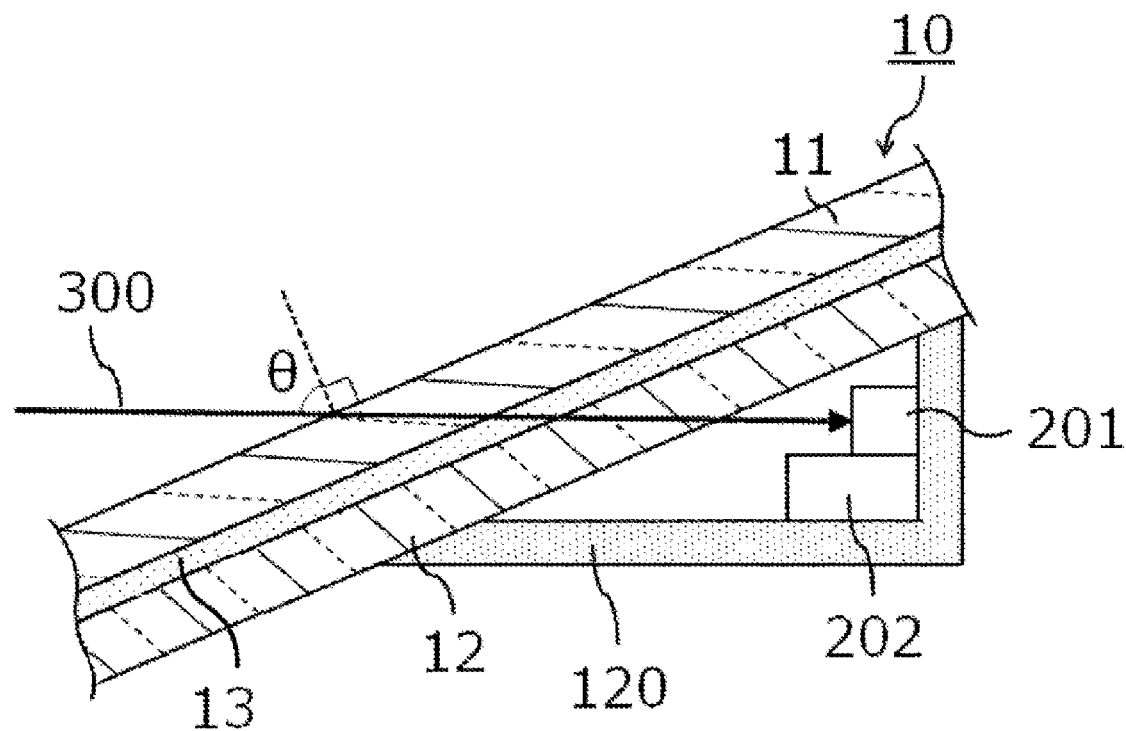
FIG. 5 is a sectional view taken along the line Y-Y in FIG. 4.

FIG. 5 is a sectional view taken by a plane that includes the line Y-Y in FIG. 4 and is perpendicular to a horizontal plane. The first glass plate 11 of the laminated glass 10 is disposed on the outside of the vehicle. Incidentally, evaluation can be made in such a manner that the incident angle θ at which radio waves 300 to be used for a communication of an information device such as the millimeter radar 201 enters the major surface of the first glass plate 11 is set at 60°, 67.5°, 20°, 45°, or the like.

EXAMPLES

Although the invention will be hereinafter described in a specific manner using Examples, the invention is not limited to them.

Test Example 1

Laminated glasses of Examples 1-49 were produced according to the following procedure. It is noted that Examples 1-48 are Inventive Examples and Example 49 is a Comparative Example. It is also noted that each Example used a first glass plate, an intermediate film, and a second glass plate each of which was 300 mm square in size.

<Production of Glass Plates of Glasses 1-12>

Twelve kinds of glass plates (glasses 1-12) were obtained so as to have glass compositions (unit: mol %) shown in Table 1. Specifically, molten glass was shaped into a band-shaped glass ribbon by a float method or a fusion method, the glass ribbon was cooled gradually while being transported horizontally, and then a rectangular glass substrate was cut out of the glass ribbon that was cooled to around room temperature, whereby the glass plate as mentioned above was obtained. Furthermore, the obtained glass plate was cut and subjected to end face working, whereby a 300 mm square glass plate was obtained. The specific gravity, the Young's modulus, the average linear expansion coefficient from 50° C. to 350° C., $T_2$, $T_4$, $T_L$, the glass transition temperature $T_g$, and the relative permittivity sr and the dielectric tangent tan δ at 10 GHz of the obtained glass plate are shown in Table 1. Symbol "-" in Table 1 means "not measured."

<Production of Laminated Glasses>

Example 1

A borosilicate glass (glass 1) that was 3.20 mm in thickness and had the composition shown in Table 1 was used as a first glass plate. A soda-lime glass (glass 7) that was 0.700 mm in thickness and the composition shown in Table 1 was used as a second glass plate. Polyvinyl butyral of 0.76 mm in thickness was used as an intermediate film. The first glass plate, the intermediate film, and the second glass plate were stacked in this order and subjected to compression bonding treatment (1 MPa, 130° C., 3 hours) using an autoclave, whereby a laminated glass of Example 1 was produced. In the laminated glass of Example 1, the total thickness of the first glass plate, the second glass plate, and the intermediate film was 4.66 mm.

Examples 2-49

Laminated glasses of Examples 2-49 were produced in the same manner as in Example 1 except for points shown in Tables 2-7.

Each of glasses 8-12 (strengthened) was chemically strengthened under the following conditions.

[Glass 8 (strengthened)]

Chemical strengthening treatment for glass 8 was performed under the following conditions. A plate glass piece was chemically strengthened by immersing it for 1.5 hours in a potassium nitrate molten salt heated to 425° C. The surface compressive stress and the stress layer depth (DOL) obtained under these conditions were about 800 MPa and 25 μm, respectively.

[Glass 9 (Strengthened)]

Chemical strengthening treatment for glass 9 was performed under the following conditions. A plate glass piece was chemically strengthened by immersing it for 1.5 hours in a potassium nitrate molten salt heated to 425° C. The surface compressive stress and the stress layer depth (DOL) obtained under these conditions were about 760 MPa and 13 μm, respectively.

[Glass 10 (Strengthened)]

Chemical strengthening treatment for glass 10 was performed under the following conditions. A plate glass piece was chemically strengthened by immersing it for 4.0 hours in a potassium nitrate molten salt heated to 425° C. The surface compressive stress and the stress layer depth (DOL) obtained under these conditions were about 900 MPa and 35 μm, respectively.

[Glass 11 (Strengthened)]

Chemical strengthening treatment for glass 11 was performed under the following conditions. A plate glass piece was chemically strengthened by immersing it for 2.5 hours in a sodium nitrate molten salt heated to 450° C. and then immersing it for 1.5 hours in a mixed molten salt, heated to 425° C., of potassium nitrate (98%) and sodium nitrate (2%). The surface compressive stress and the stress layer depth (DOL) obtained under these conditions were about 700 MPa and 120 μm, respectively.

[Glass 12 (Strengthened)]

Chemical strengthening treatment for glass 12 was performed under the following conditions. A plate glass piece was chemically strengthened by immersing it for 2.1 hours in a sodium nitrate molten salt heated to 410° C. and then immersing it for 1.0 hour in a mixed molten salt, heated to 440° C., of potassium nitrate (99%) and sodium nitrate (1%). The surface compressive stress and the stress layer depth (DOL) obtained under these conditions were about 900 MPa and 120 μm, respectively.

[Chipping Resistance]

Chipping resistance of each of the laminated glasses of Examples 1-49 was evaluated according to the following items (1) and (2).

(1) Occurrence/Non-Occurrence of Cracks

An evaluation was made on the basis of whether cracks of 5.0 mm or longer developed when a pin is collided with a target laminated glass under the following measurement conditions 1. In the evaluation, for example as shown in FIG. 2B, a "length c of cracks" means a maximum length of straight-line distances from a start point (the center (collision point) of the dent) to end points (the tips of the cracks) in radial directions of cracks that develop in radial directions (i.e., directions perpendicular to the glass thickness direction) from a dent formed by a collision.

Specifically, an evaluation was made by an impact resistance test shown in FIG. 2A. Measurement conditions 1 were as follows:

<Measurement Conditions 1>
  Collision speed V: 40 km/h
  Collision angle β: 900
  Pin: ultrahard pin
  Pin weight: 1.2 g
  Pin tip angle: 90°
  Pin tip radius: 0.2 mm
  Plan-view size of a laminated glass sample: 300 mm×300 mm
  Number of repeated tests: 10
<Evaluation>
  ○: No crack of 5.0 mm or longer developed.
  ×: A crack(s) of 5.0 mm or longer developed.
  Results are shown in Tables 2-7.

(2) Collision Speed

An evaluation can also be made by measuring a collision speed V km/h at which the length of cracks developing in a target laminated glass becomes equal to 5.0 mm when the pin is collided with the laminated glass under the following measurement conditions 2:

<Measurement Conditions 2>
  Collision speed V: 40 km/h, 60 km/h
  Collision angle β: 90°
  Pin: ultrahard pin
  Pin weight: 1.2 g
  Pin tip angle: 900
  Pin tip radius: 0.2 mm
  Plan-view size of a laminated glass sample: 300 mm×300 mm
  Number of repeated tests: 10

The collision speed V and the length of cracks have a linear relationship. Thus, a collision speed V km/h at which the length of cracks became equal to 5.0 mm was determined by measuring a crack length of a case that the collision speed V was equal to 40 km/h and a crack length of a case that the collision speed V was equal to 60 km/h.

Results are shown in Tables 2-7. Symbol "-" in Tables 2-7 means "not measured."

[Radio Wave Transparency]

A transmission characteristic (S21) for TM waves having a frequency F of 79 GHz and shinning on each of the laminated glasses of Examples 1-49 at each of incident angles of 60°, 20°, or 45° was calculated by a simulation on the basis of the relative permittivity $\varepsilon_r$ and the dielectric tangent tan δ (δ: loss angle) of each material used.

Specifically, antennas were set so as to be opposed to each other and each laminated glass obtained was set at the middle of them so that the incident angle became 60°, 20°, or 45°. And a transmission characteristic (S21) for TM waves having a frequency of 79 GHz was measured when a value of a case that no radio wave transmissive substrate was set at an opening having a diameter of 100 mm was assumed to be 0 dB. Radio wave transparency was evaluated according to the following criteria:

<Evaluation of Radio Wave Transparency>
  A: −1.8 dB≤S21
  B: −2.0 dB≤S21<−1.8 dB
  C: −2.5 dB≤S21<−2.0 dB
  D: −3.0 dB≤S21<−2.5 dB E: −4.0 dB≤S21<−3.0 dB
x: S21<−4.0 dB Results are shown in Tables 2-7. In Tables 4-7, the evaluation result "A-E" of radio wave transparency indicates that S21 was −4.0 dB or larger but it was not judged whether the evaluation result should be any of A to E.

In Examples 3, 7, 17-20, and 49, a transmission characteristic (S21) for TM waves having a frequency F and shinning at an incident angle of 600 or 67.5° was calculated by a simulation in a frequency range of 10 GHz F GHz 90 GHz. In the simulation, S21 was calculated on the basis of the relative permittivity Sr and the dielectric tangent tan δ of each material used.

Figure 6:
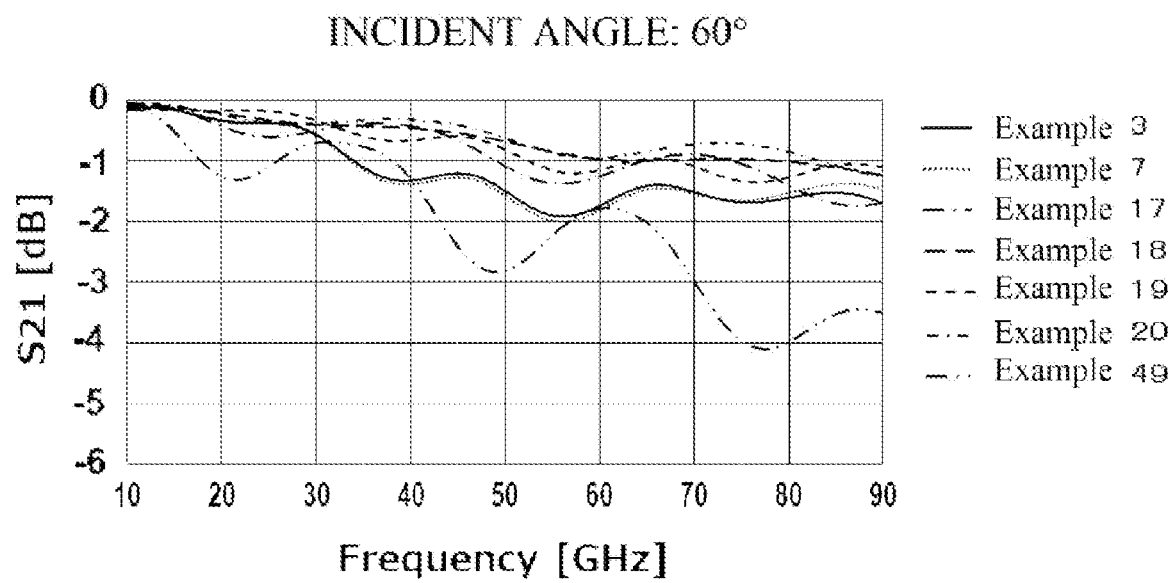
FIG. 6 is a graph showing calculation results of simulations of transmission characteristics (S21) for TM waves having a frequency F GHz and entering laminated glasses of Examples at an incident angle of 600 in a frequency range of 10 GHz≤F≤90 GHz.
Figure 7:
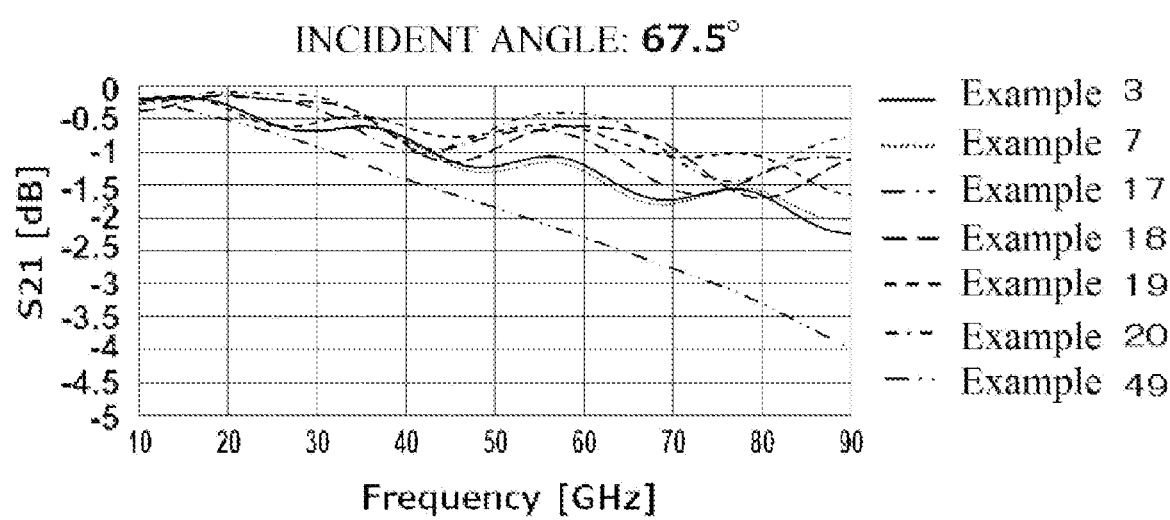
FIG. 7 is a graph showing calculation results of simulations of transmission characteristics (S21) for TM waves having a frequency F GHz and entering the laminated glasses of Examples at an incident angle of 67.5° in the frequency range of 10 GHz≤F≤90 GHz.

Results are shown in FIGS. 6 and 7.

Furthermore, in Examples 3, 7, 17-20, and 49, a transmission characteristic (S21) for TM waves having a frequency of 79 GHz or 28 GHz and shinning at an incident angle in a range of 0° to 700 was calculated by a simulation. In the simulation, S21 was calculated on the basis of the relative permittivity $\varepsilon_r$ and the dielectric tangent tan δ of each material used.

Figure 8:
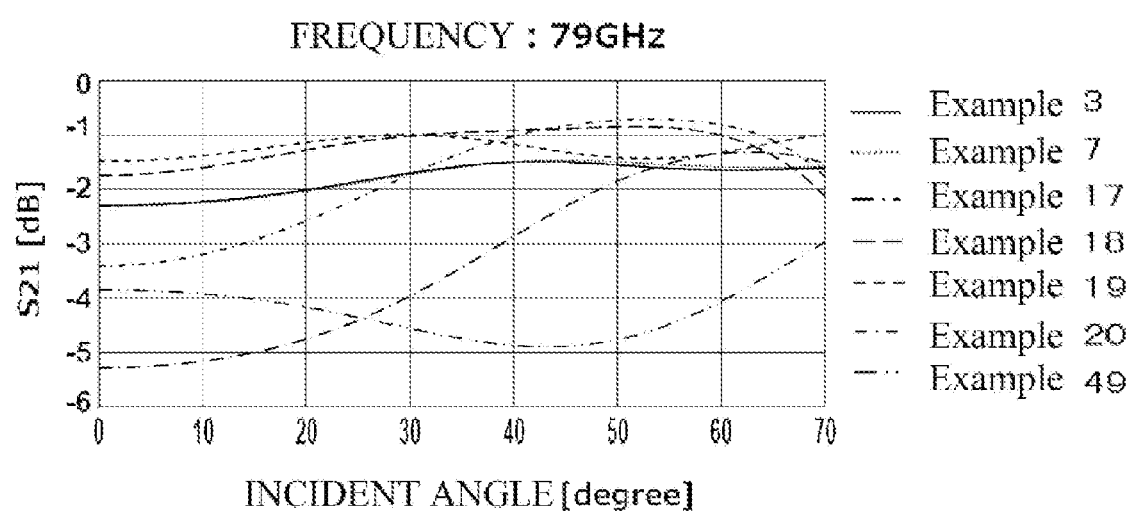
FIG. 8 is a graph showing calculation results of simulations of transmission characteristics (S21) for TM waves having a frequency F of 79 GHz and entering the laminated glasses of Examples in an incident angle range of 0° to 70°.
Figure 9:
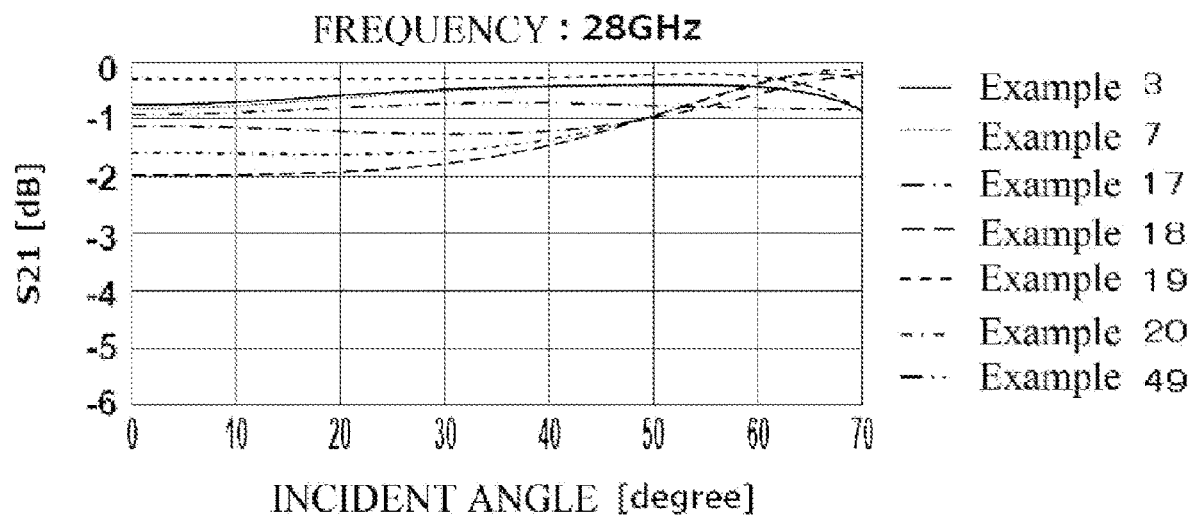
FIG. 9 is a graph showing calculation results of simulations of transmission characteristics (S21) for TM waves having a frequency F of 28 GHz and entering the laminated glasses of Examples in the incident angle range of 0° to 70°.

Results are shown in FIGS. 8 and 9.

TABLE 1

| mol % | Borosilicate | | | | | |
|---|---|---|---|---|---|---|
|  | Glass 1 | Glass 2 | Glass 3 | Glass 4 | Glass 5 | Glass 6 |
| $SiO_2$ | 65.9 | 83.5 | 61.9 | 67.2 | 67.4 | 80.2 |
| $Al_2O_3$ | 11.0 | 1.2 | 8.5 | 6.6 | 11.1 | 2.3 |
| $B_2O_3$ | 7.5 | 11.6 | 21.1 | 19.5 | 10.0 | 12.6 |
| MgO | 5.7 | 0 | 0.20 | 0.50 | 2.2 | 0 |
| CaO | 4.9 | 0 | 0.20 | 4.9 | 8.8 | 0 |
| SrO | 4.9 | 0 | 7.0 | 0.50 | 0.62 | 0 |
| BaO | 0.041 | 0 | 1.1 | 0 | 0.0043 | 0 |
| $Li_2O$ | 0 | 0 | 0 | 0 | 0 | 4.8 |
| $Na_2O$ | 0 | 3.3 | 0 | 0.80 | 0 | 0 |
| $K_2O$ | 0 | 0.46 | 0 | 0.010 | 0 | 0 |
| $ZrO_2$ | 0 | 0 | 0 | 0 | 0 | 0 |
| $TiO_2$ | 0 | 0.0080 | 0 | 0 | 0 | 0 |
| $Y_2O_3$ | 0 | 0 | 0 | 0 | 0 | 0 |
| $Fe_2O_3$ | 0.021 | 0.0078 | 0.0044 | 0.020 | 0.020 | 0.11 |
| Specific gravity | 2.51 | 2.20 | 2.41 | 2.24 | 2.38 | — |
| Young's modulus (GPa) | 76 | 64 | 60 | 58 | 73 | — |
| CTE 50-350 $\times 10^{-7}$/K | 38 | 33 | 39 | 33 | 34 | — |
| $T_2$ (° C.) | 1,650 | 1,850 | 1,660 | 1,740 | 1,690 | — |
| $T_4$ (° C.) | 1,280 | 1,260 | 1,250 | 1,300 | 1,300 | — |
| $T_L$ (° C.) | 1,270 | — | 1,280 | — | — | — |
| $T_g$ (°C) | 710 | 525 | 624 | 605 | 702 | — |
| $\varepsilon_r$ at 10 GHz | 5.46 | 4.46 | 4.84 | 4.52 | 5.15 | 4.29 |
| tan δ at 10 GHz | 0.0052 | 0.0080 | 0.0025 | 0.0037 | 0.0059 | 0.0050 |

| mol % | Soda-lime | Alkali aluminosilicate | | | | |
|---|---|---|---|---|---|---|
|  | Glass 7 | Glass 8 | Glass 9 | Glass 10 | Glass 11 | Glass 12 |
| $SiO_2$ | 69.5 | 64.3 | 68.8 | 67.1 | 64.5 | 66.2 |
| $Al_2O_3$ | 0.90 | 8.0 | 2.9 | 13.1 | 10.5 | 11.2 |
| $B_2O_3$ | 0 | 0 | 0 | 3.6 | 0 | 0 |
| MgO | 7.1 | 10.5 | 6.1 | 2.3 | 8.3 | 3.1 |
| CaO | 9.1 | 0.10 | 7.80 | 0.0 | 0.0 | 0.20 |
| SrO | 0 | 0.10 | 0 | 0 | 0 | 0 |
| BaO | 0 | 0.10 | 0 | 0 | 0 | 0 |
| $Li_2O$ | 0 | 0 | 0 | 0 | 0 | 10.4 |
| $Na_2O$ | 12.6 | 12.5 | 14.2 | 13.7 | 16.0 | 5.6 |
| $K_2O$ | 0.60 | 4.0 | 0.10 | 0.12 | 0.60 | 1.5 |
| $ZrO_2$ | 0 | 0.50 | 0 | 0 | 0.15 | 1.3 |
| $TiO_2$ | 0 | 0 | 0.010 | 0 | 0.040 | 0.12 |
| $Y_2O_3$ | 0 | 0 | 0 | 0 | 0 | 0.50 |
| $Fe_2O_3$ | 0.20 | 0.0040 | 0.038 | 0.0040 | 0.0040 | 0.0040 |
| Specific gravity | 2.51 | 2.48 | 2.50 | 2.40 | 2.46 | 2.49 |
| Young's modulus (GPa) | 74 | 74 | 71 | 69 | 73 | 86 |
| CTE 50-350 $\times 10^{-7}$/K | 91 | 98 | 91 | 77 | 89 | 81 |
| $T_2$ (° C.) | 1,460 | 1,600 | 1,470 | 1,800 | 1,640 | 1,590 |
| $T_4$ (° C.) | 1,040 | 1,180 | 1,040 | 1,350 | 1,220 | 1,140 |
| $T_L$ (° C.) | 1,010 | 1,150 | — | — | 1,140 | 1,130 |
| $T_g$ (°C) | 549 | 604 | 556 | 637 | 633 | 558 |
| $\varepsilon_r$ at 10 GHz | 6.92 | 7.15 | 7.13 | 7.02 | 7.47 | 6.90 |
| tan δ at 10 GHz | 0.014 | 0.013 | 0.018 | 0.021 | 0.016 | 0.013 |

TABLE 2

|  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| First glass plate | Thickness | 3.20 mm | 3.20 mm | 3.20 mm | 3.20 mm | 3.20 mm | 3.20 mm | 3.20 mm | 3.20 mm |
|  | Glass material | Glass 1 | Glass 2 | Glass 1 | Glass 2 | Glass 1 | Glass 2 | Glass 1 | Glass 2 |
| Intermediate film | Thickness | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB |
| Second glass plate | Thickness | 0.700 mm | 0.700 mm | 0.700 mm | 0.700 mm | 0.700 mm | 0.700 mm | 0.700 mm | 0.700 mm |
|  | Glass material | Glass 7 | Glass 7 | Glass 9 | Glass 9 | Glass 9 (strengthened) | Glass 9 (strengthened) | Glass 8 | Glass 8 |
| Chipping resistance | Occurrence of cracks | ○ | ○ | ○ | ○ | ○ | ○ | ○ | ○ |
|  | Collision speed | 65 km/h | 70 km/h | — | — | — | — | — | — |
| Radio wave transparency 79 GHz-60° |  | A | A | A | A | A | A | A | A |
| Radio wave transparency 79 GHz-20° |  | B | A | B | A | B | A | B | A |
| Radio wave transparency 79 GHz-45° |  | A | A | A | A | A | A | A | A |

TABLE 3

|  |  | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- | --- |
| First glass plate | Thickness | 3.20 mm | 3.20 mm | 3.20 mm | 3.20 mm | 3.20 mm | 3.20 mm | 3.20 mm | 3.20 mm |
|  | Glass material | Glass 1 | Glass 2 | Glass 1 | Glass 2 | Glass 1 | Glass 2 | Glass 1 | Glass 2 |
| Intermediate film | Thickness | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB |
| Second glass plate | Thickness | 0.700 mm | 0.700 mm | 0.700 mm | 0.700 mm | 0.700 mm | 0.700 mm | 0.700 mm | 0.700 mm |
|  | Glass material | Glass 8 (strengthened) | Glass 8 (strengthened) | Glass 1 | Glass 2 | Glass 10 | Glass 10 | Glass 10 (strengthened) | Glass 10 (strengthened) |
| Chipping resistance | Occurrence of cracks | ○ | ○ | ○ | ○ | ○ | ○ | ○ | ○ |
|  | Collision speed | — | — | — | — | — | — | — | — |
| Radio wave transparency 79 GHz-60° |  | A | A | A | A | C | B | C | B |
| Radio wave transparency 79 GHz-20° |  | B | A | A | B | D | D | D | D |
| Radio wave transparency 79 GHz-45° |  | A | A | A | A | C | C | C | C |

TABLE 4

|  |  | Ex. 17 | Ex. 18 | Ex. 19 | Ex. 20 | Ex. 21 | Ex. 22 | Ex. 23 | Ex. 24 |
| --- | --- | --- | --- | --- | --- | --- | --- | --- | --- |
| First glass plate | Thickness | 2.00 mm | 2.00 mm | 3.20 mm | 2.00 mm | 2.00 mm | 2.00 mm | 3.20 mm | 3.20 mm |
|  | Glass material | Glass 1 | Glass 2 | Glass 1 | Glass 3 | Glass 4 | Glass 5 | Glass 1 | Glass 2 |
| Intermediate film | Thickness | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB |
| Second glass plate | Thickness | 2.00 mm | 2.00 mm | 0.700 mm | 2.00 mm | 2.00 mm | 2.00 mm | 0.700 mm | 0.700 mm |
|  | Glass material | Glass 1 | Glass 2 | Glass 3 | Glass 3 | Glass 4 | Glass 5 | Glass 11 | Glass 11 |
| Chipping resistance | Occurrence of cracks | ○ | ○ | ○ | ○ | ○ | ○ | ○ | ○ |
|  | Collision speed | — | — | — | — | — | — | — | — |
| Radio wave transparency 79 GHz-60° |  | A | A | A | A | A | A | A-E | A-E |

TABLE 4-continued

|  | Ex. 17 | Ex. 18 | Ex. 19 | Ex. 20 | Ex. 21 | Ex. 22 | Ex. 23 | Ex. 24 |
|---|---|---|---|---|---|---|---|---|
| Radio wave transparency 79 GHz-20° | x | A | A | D | A | E | A-E | A-E |
| Radio wave transparency 79 GHz-45° | B | A | A | A | A | A | A-E | A-E |

TABLE 5

|  |  | Ex. 25 | Ex. 26 | Ex. 27 | Ex. 28 | Ex. 29 | Ex. 30 | Ex. 31 | Ex. 32 |
|---|---|---|---|---|---|---|---|---|---|
| First glass plate | Thickness | 3.20 mm | 3.20 mm | 3.20 mm | 3.20 mm | 3.20 mm | 3.20 mm | 3.20 mm | 3.20 mm |
|  | Glass material | Glass 1 | Glass 2 | Glass 1 | Glass 2 | Glass 1 | Glass 2 | Glass 5 | Glass 5 |
| Intermediate film | Thickness | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB |
| Second glass plate | Thickness | 0.700 mm | 0.700 mm | 0.700 mm | 0.700 mm | 0.700 mm | 0.700 mm | 0.700 mm | 0.700 mm |
|  | Glass material | Glass 11 (strengthened) | Glass 11 (strengthened) | Glass 12 | Glass 12 | Glass 12 (strengthened) | Glass 12 (strengthened) | Glass 10 | Glass 10 (strengthened) |
| Chipping resistance | Occurrence of cracks | ○ | ○ | ○ | ○ | ○ | ○ | ○ | ○ |
|  | Collision speed | — | — | — | — | — | — | — | — |
| Radio wave transparency 79 GHz-60° |  | A-E | A-E | A-E | A-E | A-E | A-E | B | B |
| Radio wave transparency 79 GHz-20° |  | A-E | A-E | A-E | A-E | A-E | A-E | C | C |
| Radio wave transparency 79 GHz-45° |  | A-E | A-E | A-E | A-E | A-E | A-E | C | C |

TABLE 6

|  |  | Ex. 33 | Ex. 34 | Ex. 35 | Ex. 36 | Ex. 37 | Ex. 38 | Ex. 39 | Ex. 40 |
|---|---|---|---|---|---|---|---|---|---|
| First glass plate | Thickness | 3.20 mm | 3.20 mm | 2.00 mm | 2.00 mm | 2.00 mm | 3.20 mm | 3.20 mm | 3.20 mm |
|  | Glass material | Glass 5 | Glass 5 | Glass 6 | Glass 6 | Glass 6 | Glass 6 | Glass 6 | Glass 6 |
| Intermediate film | Thickness | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB |
| Second glass plate | Thickness | 0.700 mm | 0.700 mm | 0.700 mm | 0.700 mm | 0.700 mm | 0.700 mm | 0.700 mm | 0.700 mm |
|  | Glass material | Glass 4 | Glass 7 | Glass 6 | Glass 1 | Glass 2 | Glass 1 | Glass 2 | Glass 6 |
| Chipping resistance | Occurrence of cracks | ○ | ○ | ○ | ○ | ○ | ○ | ○ | ○ |
|  | Collision speed | — | — | — | — | — | — | — | — |
| Radio wave transparency 79 GHz-60° |  | A-E | A | A | A | A | A | A | A |
| Radio wave transparency 79 GHz-20° |  | A-E | A | C | B | C | A | B | B |
| Radio wave transparency 79 GHz-45° |  | A-E | A | A | A | A | A | A | A |

TABLE 7

|  |  | Ex. 41 | Ex. 42 | Ex. 43 | Ex. 44 | Ex. 45 | Ex. 46 | Ex. 47 | Ex. 48 | Ex. 49 |
|---|---|---|---|---|---|---|---|---|---|---|
| First glass plate | Thickness | 3.20 mm | 3.20 mm | 3.20 mm | 3.20 | 3.20 mm | 3.20 mm | 3.20 mm | 3.20 mm | 3.20 mm |
|  | Glass material | Glass 6 | Glass 6 | Glass 6 | Glass 6 | Glass 6 | Glass 6 | Glass 6 | Glass 6 | Glass 7 |
| Intermediate film | Thickness | 0.76 mm | 0.76 mm | 0.76 mm | 0.76 mm | 0.76 mm | 0.76 mm | 0.76 mm | 0.76 mm | 0.76 mm |
|  | Resin material | PVB | PVB | PVB | PVB | PVB | PVB | PVB | PVB | PVB |

TABLE 7-continued

| | | Ex. 41 | Ex. 42 | Ex. 43 | Ex. 44 | Ex. 45 | Ex. 46 | Ex. 47 | Ex. 48 | Ex. 49 |
|---|---|---|---|---|---|---|---|---|---|---|
| Second glass plate | Thickness | 0.700 mm | 0.700 mm | 0.700 mm | 0.700 mm | 0.700 mm | 0.700 mm | 0.700 mm | 0.700 mm | 2.00 mm |
| | Glass material | Glass 7 | Glass 8 | Glass 8 (strengthened) | Glass 9 | Glass 11 | Glass 11 (strengthened) | Glass 12 | Glass 12 (strengthened) | Glass 7 |
| Chipping resistance | Occurrence of cracks | ○ | ○ | ○ | ○ | ○ | ○ | ○ | ○ | x |
| | Collision speed | — | — | — | — | — | — | — | — | 40 km/h |
| Radio wave transparency 79 GHz-60° | | A | A | A | A | A-E | A-E | A-E | A-E | x |
| Radio wave transparency 79 GHz-20° | | A | A | A | A | A-E | A-E | A-E | A-E | x |
| Radio wave transparency 79 GHz-45° | | A | A | A | A | A-E | A-E | A-E | A-E | x |

As is understood from the above results that the chipping resistance of each of the laminated glasses of Examples 1-48 was good.

Furthermore, the transmission characteristic S21 of each of the laminated glasses of Examples 1-48 in the case that TM radio waves having the frequency of 79 GHz were shone at the incident angle of 60° or 450 was −4.0 dB or larger and hence its radio wave transparency was good. Still further, the transmission characteristic S21 of each of the laminated glasses of Examples 1-16 and 18-48 in the case that TM radio waves having the frequency of 79 GHz were shone at the incident angle of 200 was −4.0 dB or larger and hence its radio wave transparency was good.

Although no results of the case that TM radio waves having the frequency of 79 GHz were shone at the incident angle of 67.5° are shown in Tables 2-7, they were on the same levels as the transmission characteristic (S21) obtained at the incident angle of 60°. In particular, the transmission characteristic (S21) of each of the Examples 1-48 was −3.1 dB or larger and hence its radio wave transparency was good.

Furthermore, as shown in FIGS. 7 and 8, the transmission characteristic S21 of each of the laminated glasses of Examples 3, 7, and 17-20 in the case that TM radio waves having the frequency of 79 GHz were shone at the incident angle of 67.5° was −3.1 dB or larger, in particular, −1.8 dB or larger, and hence its radio wave transparency was good.

As shown in FIG. 8, it was found that the transmission characteristic S21 of each of the laminated glasses of Examples 3, 7, and 19 in the case that TM radio waves having the frequency of 79 GHz were shone was low in angle dependence because the first glass plate and the second glass plate were different from each other in thickness. It is noted that in each of Examples 3 and 17, a laminated glass was produced actually under the conditions shown in Table 2 or 4 and TM radio waves having a frequency of 79 GHz were measured while the incident angle was varied: a characteristic similar to the simulation result shown in FIG. 8 was obtained.

Still further, as shown in FIG. 9, the transmission characteristic S21 of each of the laminated glasses of Examples 3, 7, and 17-20 in the case that TM radio waves having the frequency 28 GHz were shone in an incident angle range of 0° to 700 was −2.0 dB or larger. In particular, in Examples 17 and 18, the transmission characteristic S21 in the case that TM radio waves having the frequency 28 GHz were shone at the incident angle of 67.5° was −0.28 dB or larger.

On the other hand, in the laminated glass of Example 49, the chipping resistance was bad.

In the laminated glass of Example 49, the transmission characteristic S21 in the case that TM radio waves having the frequency of 79 GHz were shone at each of the incident angle of 60°, 20°, or 450 was smaller than −4.0 dB and hence the radio wave transparency was bad. Furthermore, as shown in FIG. 7 etc., the transmission characteristic S21 of the laminated glass of Example 49 in the case that TM radio waves having the frequency of 79 GHz were shone at the incident angle of 67.5° was smaller than −3.1 dB.

Test Example 2

<Production of Laminated Glasses>

Examples 50-63

Laminated glasses of Examples 50-63 were produced in the same manner as in Example 1 of Test Example 1 except that the first glass plate and the second glass plate were changed as shown in Table 8. Examples 50-63 are Inventive Examples.

[Radio Wave Transparency]

A transmission characteristic (S21) for TM waves having a frequency F and shinning on each of the laminated glasses of Examples 50-63 at an incident angle of 60°, 20°, 45°, or 67.5° was calculated by a simulation in a frequency range of 10 GHz≤F≤90 GHz. In the simulation, S21 was calculated on the basis of the relative permittivity $\varepsilon_r$ and the dielectric tangent tan δ of each material used. A transmission characteristic (S21) for TM waves having a frequency F of 79 GHz and shone at an incident angle of 600 was evaluated in the same manner as in Test Example 1.

Results are shown in Table 8 and FIGS. 10-13.

TABLE 8

| | | Ex. 50 | Ex. 51 | Ex. 52 | Ex. 53 | Ex. 54 | Ex. 55 | Ex. 56 |
|---|---|---|---|---|---|---|---|---|
| First glass plate | Thickness | 10.0 mm | 10.0 mm | 10.0 mm | 10.0 mm | 10.0 mm | 10.0 mm | 10.0 mm |
| | Glass material | Glass 1 | Glass 1 | Glass 1 | Glass 1 | Glass 1 | Glass 1 | Glass 1 |

TABLE 8-continued

| Intermediate film | Thickness | 0.76 mm | 0.76 mm | 0.76 mm | 0.76 mm | 0.76 mm | 0.76 mm | 0.76 mm |
|---|---|---|---|---|---|---|---|---|
| | Resin material | PVB | PVB | PVB | PVB | PVB | PVB | PVB |
| Second glass plate | Thickness | 2.00 mm | 1.00 mm | 1.75 mm | 1.50 mm | 1.25 mm | 1.00 mm | 2.00 mm |
| | Glass material | Glass 7 | Glass 7 | Glass 1 | Glass 1 | Glass 1 | Glass 1 | Glass 1 |
| Radio wave transparency 79 GHz-60° | | E | E | C | D | D | C | D |
| Radio wave transparency 79 GHz-20° | | x | x | E | D | E | E | E |
| Radio wave transparency 79 GHz-45° | | x | x | D | E | x | E | x |

| | | Ex. 57 | Ex. 58 | Ex. 59 | Ex. 60 | Ex. 61 | Ex. 62 | Ex. 63 |
|---|---|---|---|---|---|---|---|---|
| First glass plate | Thickness | 10.0 mm | 10.0 mm | 10.0 mm | 10.0 mm | 10.0 mm | 10.0 mm | 10.0 mm |
| | Glass material | Glass 2 | Glass 2 | Glass 2 | Glass 2 | Glass 2 | Glass 2 | Glass 2 |
| Intermediate film | Thickness | 0.76 mm | 0.76 mm | 0.76 mm | 0.76 mm | 0.76 mm | 0.76 mm | 0.76 mm |
| | Resin material | PVB | PVB | PVB | PVB | PVB | PVB | PVB |
| Second glass plate | Thickness | 2.00 mm | 1.00 mm | 1.00 mm | 1.25 mm | 1.50 mm | 1.75 mm | 2.00 mm |
| | Glass material | Glass 7 | Glass 7 | Glass 2 | Glass 2 | Glass 2 | Glass 2 | Glass 2 |
| Radio wave transparency 79 GHz.-60° | | E | D | C | C | C | C | C |
| Radio wave transparency 79 GHz-20° | | x | x | E | E | D | D | E |
| Radio wave transparency 79 GHz-45° | | x | x | C | E | E | D | C |

Figure 10:
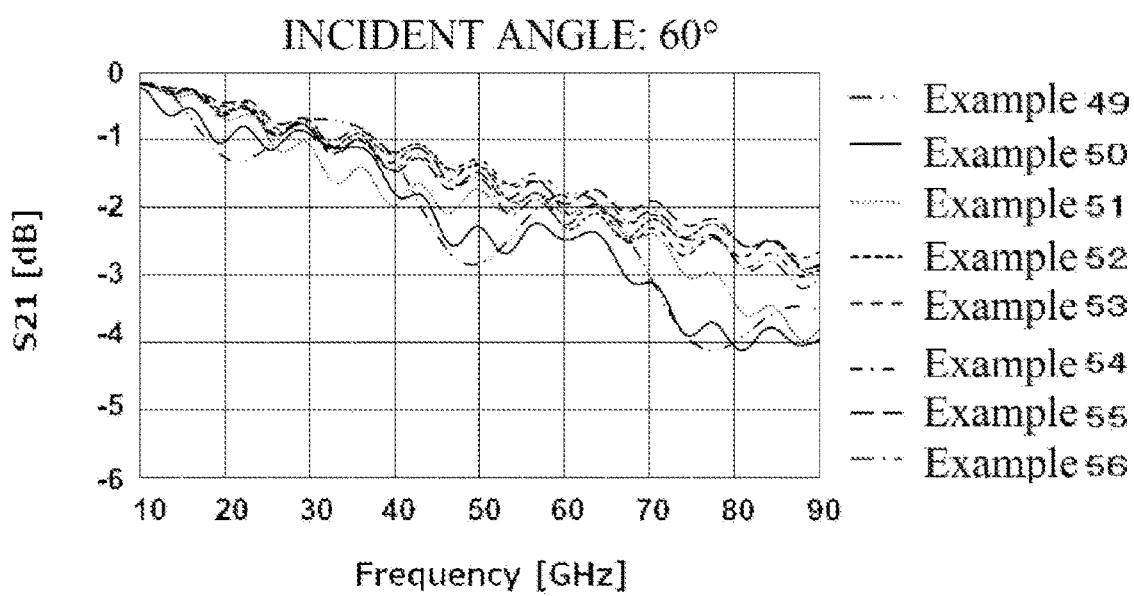
FIG. 10 is a graph showing calculation results of simulations of transmission characteristics (S21) for TM waves having a frequency F GHz and entering laminated glasses of Examples at an incident angle of 600 in a frequency range of 10 GHz≤F GHz≤90 GHz.
Figure 11:
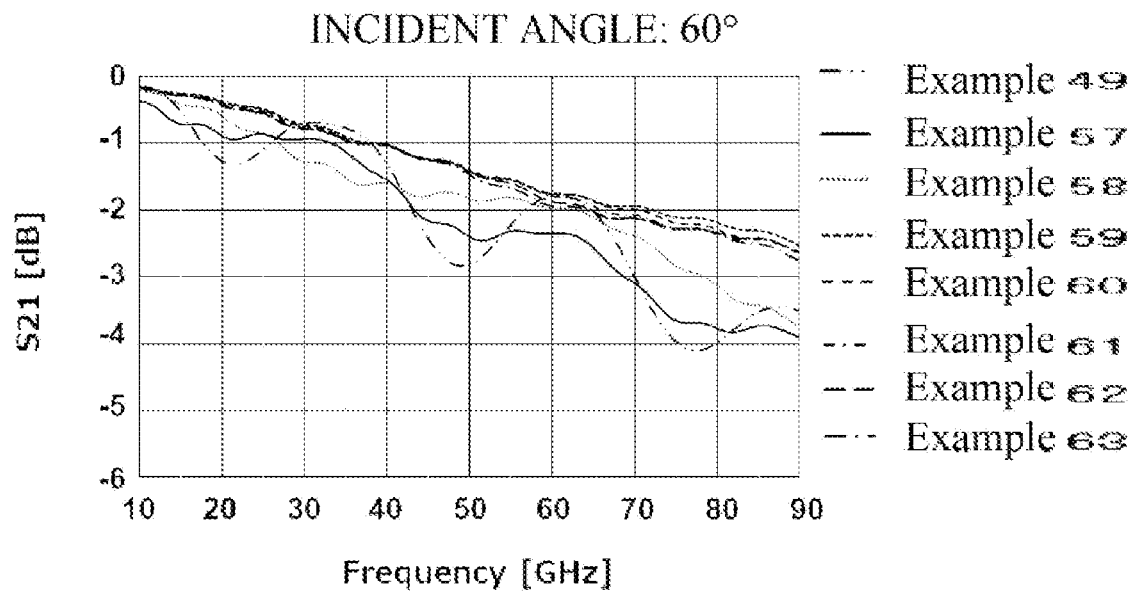
FIG. 11 is a graph showing calculation results of simulations of transmission characteristics (S21) for TM waves having a frequency F GHz and entering the laminated glasses of other Examples at the incident angle of 600 in the frequency range of 10 GHz≤F≤90 GHz.
Figure 12:
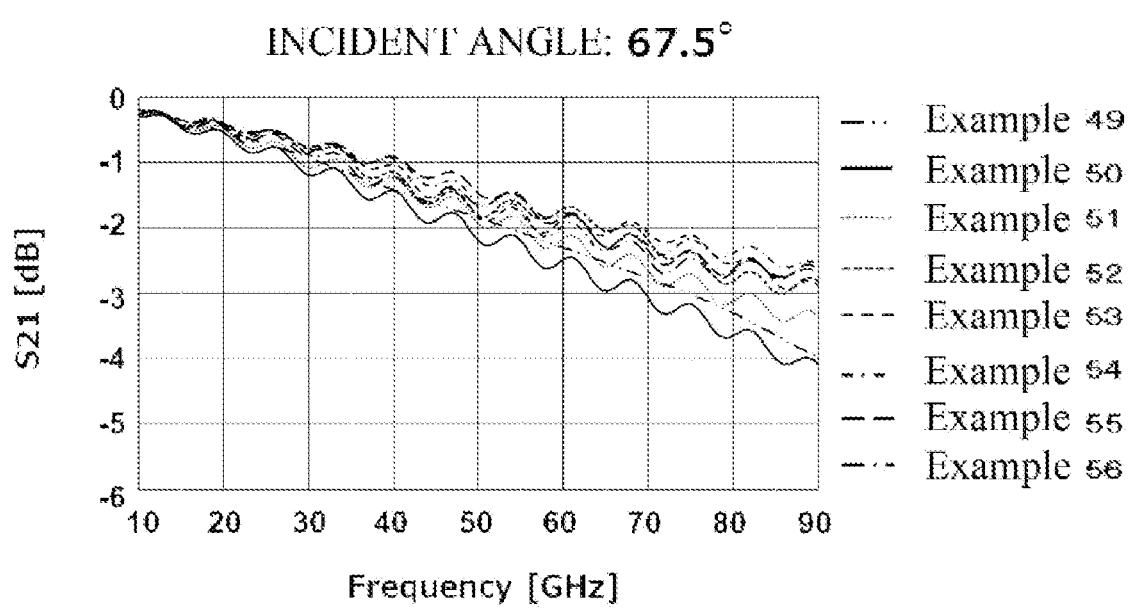
FIG. 12 is a graph showing calculation results of simulations of transmission characteristics (S21) for TM waves having a frequency F GHz and entering the laminated glasses of Examples at an incident angle of 67.5° in the frequency range of 10 GHz≤F≤90 GHz.
Figure 13:
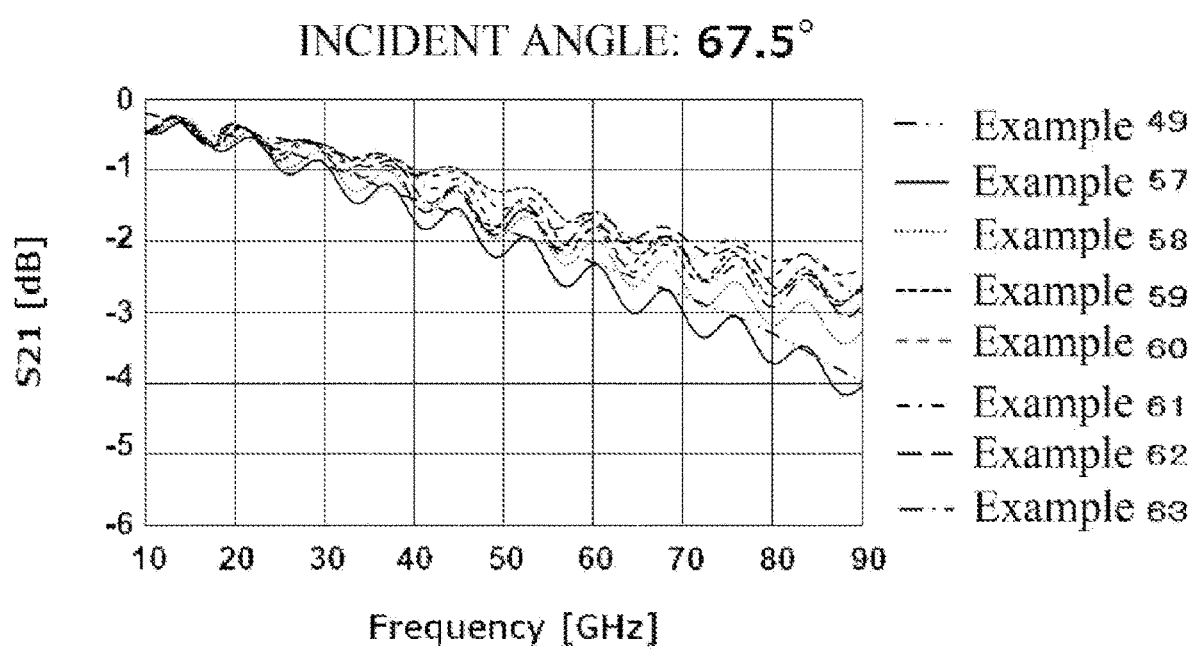
FIG. 13 is a graph showing calculation results of simulations of transmission characteristics (S21) for TM waves having a frequency F GHz and entering the laminated glasses of the other Examples at the incident angle of 67.5° in the frequency range of 10 GHz≤F≤90 GHz.

As shown in Table 8 and FIGS. 10 and 11, in each of the laminated glasses of Examples 50-63, the transmission characteristic S21 in the case that TM radio waves having the frequency of 79 GHz were shone at the incident angle of 600 was −4.0 dB or larger and hence its radio wave transparency was good.

Furthermore, as shown in Table 8, in each of the laminated glasses of Examples 52-56 and 59-63, the transmission characteristic S21 in the case that TM radio waves having the frequency of 79 GHz were shone at the incident angle of 20° was −4.0 dB or larger and hence its radio wave transparency was good.

Still further, as shown in Table 8, in each of the laminated glasses of Examples 52, 53, 55 and 59-63, the transmission characteristic S21 in the case that TM radio waves having the frequency of 79 GHz were shone at the incident angle of 45° was −4.0 dB or larger and hence its radio wave transparency was good.

Even still further, as shown in FIGS. 10 and 11, in each of the laminated glasses of Examples 51-56 and 58-63, the transmission characteristic S21 in the case that TM radio waves having the frequency of 79 GHz were shone at the incident angle of 67.5° was −3.1 dB or larger and hence its radio wave transparency was good.

Incidentally, as for the chipping resistance, since the first glass plate of each of the laminated glasses of Examples 50-63 was thicker than that of each of the laminated glasses of Examples 1-48 in Test Example 1, it is considered that the laminated glasses of Examples 50-63 are higher than or equivalent to the laminated glasses of Examples 1-48 in chipping resistance.

Although the various embodiments have been described above with reference to the drawings, it goes without saying that the invention is not limited to those examples. It is apparent that those skilled in the art could conceive various changes and modifications within the confines of the claims, and they are naturally construed as being included in the technical scope of the disclosure. Constituent elements of the above-described embodiments may be combined without departing from the spirit and scope of the invention.

The present application is based on Japanese Patent Application No. 2020-081159 filed on May 1, 2020, the disclosure of which is incorporated herein by reference.

DESCRIPTION OF SYMBOLS

10: Vehicular laminated glass
11: First glass plate
12: Second glass plate
13: Intermediate film
100: Automobile
110: Opening
120: Housing
150: Rearview mirror
201: Millimeter-wave radar
202: Stereo camera
300: Radio waves

The invention claimed is:
1. A vehicular laminated glass comprising:
a first glass plate;
a second glass plate; and
an intermediate film sandwiched between the first glass plate and the second glass plate, wherein
a total thickness of the first glass plate, the second glass plate, and the intermediate film is 4.0 mm or larger;
the first glass plate is thicker than the second glass plate;
the first glass plate and the second glass plate are each a borosilicate glass containing $B_2O_3$ at 1.0% or more in mole percentage in terms of oxides;
a composition of the borosilicate glass of at least one of the first glass plate and the second glass plate is given as follows in mole percentage in terms of oxides:
$85\% \leq SiO_2 + Al_2O_3 + B_2O_3 \leq 98\%$,
$60\% \leq SiO_2 \leq 90\%$,
$0\% \leq Al_2O_3 \leq 10\%$,
$1.0\% \leq B_2O_3 \leq 25\%$,

1.0%≤R$_2$O≤10%,
0%≤RO≤9.0%,
0≤Li$_2$O/R$_2$O≤1.0,
0≤Na$_2$O/R$_2$O≤0.90, and
0≤K$_2$O/R$_2$O≤0.70,
where R$_2$O represents a total content of Li$_2$O, Na$_2$O, and K$_2$O and RO represents a total content of MgO, CaO, SrO and BaO;
when the first glass plate satisfies the composition above, the first glass plate has a relative permittivity at 10 GHz of 6.00 or lower; and
when the second glass plate satisfies the composition above, the second glass plate has a relative permittivity at 10 GHz of 6.00 or lower; and
a transmission characteristic S21 that is obtained when TM radio waves having a frequency of 79 GHz enter the first glass plate of the vehicular laminated glass at an incident angle of 60° is −4.0 dB or larger.

2. The vehicular laminated glass according to claim 1, wherein a transmission characteristic S21 that is obtained when TM radio waves having a frequency of 79 GHz enter the first glass plate at an incident angle of 67.5° is −3.1 dB or larger.

3. The vehicular laminated glass according to claim 1, wherein a transmission characteristic S21 that is obtained when TM radio waves having a frequency 28 GHz enter the first glass plate at an incident angle in a range of 0° to 700 is −2.0 dB or larger.

4. The vehicular laminated glass according to claim 1, wherein a transmission characteristic S21 that is obtained when TM radio waves having a frequency 28 GHz enter the first glass plate at an incident angle of 67.5° is −0.28 dB or larger.

5. The vehicular laminated glass according to claim 1, wherein a transmission characteristic S21 that is obtained when TM radio waves having a frequency of 79 GHz enter the first glass plate at an incident angle of 450 is −4.0 dB or larger.

6. The vehicular laminated glass according to claim 1, wherein a transmission characteristic S21 that is obtained when TM radio waves having a frequency of 79 GHz enter the first glass plate at an incident angle of 20° is −4.0 dB or larger.

7. The vehicular laminated glass according to claim 1, wherein a thickness of the first glass plate is 2.50 mm or larger.

8. The vehicular laminated glass according to claim 1, wherein a thickness of the second glass plate is 1.50 mm or smaller.

9. The vehicular laminated glass according to claim 1, wherein
the first glass plate is a borosilicate glass having a composition given as follows in mole percentage in terms of oxides:
85%≤SiO$_2$+Al$_2$O$_3$+B$_2$O$_3$≤98%,
60%≤SiO$_2$≤90%,
0%≤Al$_2$O$_3$≤10%,
1.0%≤B$_2$O$_3$≤25%,
1.0%≤R$_2$O≤10%,
0%≤RO≤9.0%,
0≤Li$_2$O/R$_2$O≤1.0,
0≤Na$_2$O/R$_2$O≤0.90, and
0≤K$_2$O/R$_2$O≤0.70,
where R$_2$O represents a total content of Li$_2$O, Na$_2$O, and K$_2$O and RO represents a total content of MgO, CaO, SrO and BaO; and
the second glass plate is an alkali aluminosilicate glass containing Al$_2$O$_3$ at 1.0% or more in mole percentage in terms of oxides.

10. The vehicular laminated glass according to claim 9, wherein the second glass plate is a chemically strengthened glass.

11. The vehicular laminated glass according to claim 9, wherein a composition of the alkali aluminosilicate glass of the second glass plate is given as follows in mole percentage in terms of oxides:
61%≤SiO$_2$≤77%,
1.0%≤Al$_2$O$_3$≤20%,
1.0%≤B$_2$O$_3$≤10%
0%≤MgO≤15%,
0%≤CaO≤10%,
0%≤SrO≤1.0%,
0%≤BaO≤1.0%,
0%≤Li$_2$O≤15%,
2.0%≤Na$_2$O≤15%,
0%≤K$_2$O≤6.0%,
0%≤ZrO$_2$≤4.0%,
0%≤TiO$_2$≤1.0%,
0%≤Y$_2$O$_3$≤2.0%,
10%≤R$_2$O≤25%, and
0%≤RO≤20%,
where R$_2$O represents a total content of Li$_2$O, Na$_2$O, and K$_2$O and RO represents a total content of MgO, CaO, SrO and BaO.

12. The vehicular laminated glass according to claim 1, wherein
the first glass plate is a borosilicate glass having a composition given as follows in mole percentage in terms of oxides:
85%≤SiO$_2$+Al$_2$O$_3$+B$_2$O$_3$≤98%,
60%≤SiO$_2$≤90%,
0%≤Al$_2$O$_3$≤10%,
1.0%≤B$_2$O$_3$≤25%,
1.0%≤R$_2$O≤10%,
0%≤RO≤9.0%,
0≤Li$_2$O/R$_2$O≤1.0,
0≤Na$_2$O/R$_2$O≤0.90, and
0≤K$_2$O/R$_2$O≤0.70,
where R$_2$O represents a total content of Li$_2$O, Na$_2$O, and K$_2$O and RO represents a total content of MgO, CaO, SrO and BaO; and
the second glass plate is a soda-lime glass containing Al$_2$O$_3$ at less than 1.0% in mole percentage in terms of oxides.

13. The vehicular laminated glass according to claim 1, wherein the intermediate film is polyvinyl butyral.

14. The vehicular laminated glass according to claim 1, wherein a thickness of the intermediate film is in a range of 0.30 mm to 1.0 mm.

15. The vehicular laminated glass according to claim 1, wherein no crack that is 5.0 mm or longer develops when a pin has been collided with the glass under the following measurement conditions:
<Measurement Conditions>
Collision speed V: 40 km/h
Collision angle β: 90°
Pin: ultrahard pin
Pin weight: 1.2 g
Pin tip angle: 90°
Pin tip radius: 0.2 mm
Plan-view size of a laminated glass sample: 300 mm×300 mm
Number of repeated tests: 10.

16. The vehicular laminated glass according to claim 1, wherein a content of $Fe_2O_3$ in the borosilicate glass is 0.0010% or more.

17. The vehicular laminated glass according to claim 1, wherein a content of $Fe_2O_3$ in the borosilicate glass is 0.010% or more.

18. The vehicular laminated glass according to claim 1, wherein a content of $Fe_2O_3$ in the borosilicate glass is 0.050% or more.

19. The vehicular laminated glass according to claim 1, wherein a content of $Fe_2O_3$ in the borosilicate glass is 1.0% or less.

20. The vehicular laminated glass according to claim 1, wherein
when the first glass plate satisfies the composition, the first glass plate has a relative permittivity at 10 GHz of 3.80 or higher; and
when the second glass plate satisfies the composition, the second glass plate has a relative permittivity at 10 GHz of 3.80 or higher.

21. The vehicular laminated glass according to claim 1, wherein
when the first glass plate satisfies the composition, the first glass plate has a dielectric tangent at 10 GHz of 0.01 or lower; and
when the second glass plate satisfies the composition, the second glass plate has a dielectric tangent at 10 GHz of 0.01 or lower.

22. The vehicular laminated glass according to claim 1, wherein
when the first glass plate satisfies the composition, the first glass plate has a dielectric tangent at 10 GHz of 0.003 or higher; and
when the second glass plate satisfies the composition, the second glass plate has a dielectric tangent at 10 GHz of 0.003 or higher.

23. A vehicular laminated glass comprising:
a first glass plate;
a second glass plate; and
an intermediate film sandwiched between the first glass plate and the second glass plate, wherein
a total thickness of the first glass plate, the second glass plate, and the intermediate film is 4.0 mm or larger;
the first glass plate is thicker than the second glass plate;
the first glass plate and the second glass plate are each a borosilicate glass containing $B_2O_3$ at 1.0% or more in mole percentage in terms of oxides;
a composition of the borosilicate glass of at least one of the first glass plate and the second glass plate is given as follows in mole percentage in terms of oxides:
$82\% \leq SiO_2 + Al_2O_3 + B_2O_3 \leq 98\%$,
$55\% \leq SiO_2 \leq 80\%$,
$0\% \leq Al_2O_3 \leq 20\%$,
$1.0\% \leq B_2O_3 \leq 25\%$,
$0\% \leq R_2O \leq 5.0\%$, and
$0\% \leq RO \leq 25\%$,
where $R_2O$ represents a total content of $Li_2O$, $Na_2O$, and $K_2O$ and RO represents a total content of MgO, CaO, SrO and BaO;
when the first glass plate satisfies the composition above, the first glass plate has a relative permittivity at 10 GHz of 6.00 or lower; and
when the second glass plate satisfies the composition above, the second glass plate has a relative permittivity at 10 GHz of 6.00 or lower; and
a transmission characteristic S21 that is obtained when TM radio waves having a frequency of 79 GHz enter the first glass plate of the vehicular laminated glass at an incident angle of 60° is −4.0 dB or larger.

24. The vehicular laminated glass according to claim 23, wherein the borosilicate class has a composition in which $63\% \leq SiO_2 \leq 80\%$.

25. The vehicular laminated glass according to claim 23, wherein the borosilicate class has a composition in which $0.0010\% \leq R_2O \leq 5.0\%$.

26. The vehicular laminated glass according to claim 23, wherein a content of $Fe_2O_3$ in the borosilicate glass is 0.0010% or more.

27. The vehicular laminated glass according to claim 23, wherein a content of $Fe_2O_3$ in the borosilicate glass is 0.010% or more.

28. The vehicular laminated glass according to claim 23, wherein a content of $Fe_2O_3$ in the borosilicate glass is 0.050% or more.

29. The vehicular laminated glass according to claim 23, wherein a content of $Fe_2O_3$ in the borosilicate glass is 1.0% or less.

30. The vehicular laminated glass according to claim 23, wherein
when the first glass plate satisfies the composition, the first glass plate has a relative permittivity at 10 GHz of 4.50 or higher; and
when the second glass plate satisfies the composition, the second glass plate has a relative permittivity at 10 GHz of 4.50 or higher.

31. The vehicular laminated glass according to claim 23, wherein
when the first glass plate satisfies the composition, the first glass plate has a dielectric tangent at 10 GHz of 0.008 or lower; and
when the second glass plate satisfies the composition, the second glass plate has a dielectric tangent at 10 GHz of 0.008 or lower.

32. The vehicular laminated glass according to claim 23, wherein
when the first glass plate satisfies the composition, the first glass plate has a dielectric tangent at 10 GHz of 0.002 or higher; and
when the second glass plate satisfies the composition, the second glass plate has a dielectric tangent at 10 GHz of 0.002 or higher.

* * * * *